US012804778B2

(12) United States Patent
Kaizu et al.

(10) Patent No.: US 12,804,778 B2
(45) Date of Patent: Nov. 17, 2026

(54) PLANAR HEATING ELEMENT

(71) Applicant: Fujikura Ltd., Tokyo (JP)

(72) Inventors: Masahiro Kaizu, Chiba (JP); Takashi Kameshima, Chiba (JP); Kentaro Nomachi, Chiba (JP)

(73) Assignee: Fujikura Ltd., Tokyo (JP)

( * ) Notice: Subject to any disclaimer, the term of this patent is extended or adjusted under 35 U.S.C. 154(b) by 600 days.

(21) Appl. No.: 18/549,895

(22) PCT Filed: Mar. 10, 2021

(86) PCT No.: PCT/JP2021/009565
§ 371 (c)(1),
(2) Date: Sep. 8, 2023

(87) PCT Pub. No.: WO2022/190267
PCT Pub. Date: Sep. 15, 2022

(65) Prior Publication Data
US 2024/0155742 A1 May 9, 2024

(51) Int. Cl.
*H05B 3/34* (2006.01)
*B60N 2/56* (2006.01)

(52) U.S. Cl.
CPC ............. *H05B 3/34* (2013.01); *B60N 2/5678* (2013.01)

(58) Field of Classification Search
CPC ................ H05B 3/34; H05B 2203/003; H05B 2203/014; H05B 2203/029; H05B 3/286; B60N 2/5678; B60N 2/5685
See application file for complete search history.

(56) References Cited

U.S. PATENT DOCUMENTS

| | | | | |
|---|---|---|---|---|
| 7,202,444 B2 | 4/2007 | Bulgajewski | | |
| 2003/0178413 A1 | 9/2003 | Rock et al. | | |
| 2011/0226751 A1* | 9/2011 | Lazanja | ................ | A47C 7/748 219/217 |
| 2013/0068748 A1 | 3/2013 | Csonti et al. | | |

FOREIGN PATENT DOCUMENTS

| | | |
|---|---|---|
| DE | 102008064225 A1 | 5/2010 |
| JP | S60-180086 A | 9/1985 |
| JP | H02-015588 A | 1/1990 |
| JP | H07-008992 U | 2/1995 |

(Continued)

OTHER PUBLICATIONS

International Search Report issued in corresponding International Application No. PCT/JP2021/009565 mailed May 11, 2021 (3 pages).

*Primary Examiner* — Robert G Bachner
(74) *Attorney, Agent, or Firm* — Osha Bergman Watanabe & Burton LLP

(57) ABSTRACT

A planar heating element includes an insulating resin film and a heating portion that includes a conductive circuit on the insulating resin film. The insulating resin film includes missing portions penetrating the insulating resin film, surrounding a point on the insulating resin film, and including one or both of openings and recesses. The openings are disposed within the conductive circuit and outside of a circular region of a radius centered at the point. The recesses are recessed toward an inside of the insulating resin film and located on an outer edge of the insulating resin film.

11 Claims, 14 Drawing Sheets

(56) References Cited

FOREIGN PATENT DOCUMENTS

| | | | |
|---|---|---|---|
| JP | H09-234753 | A | 9/1997 |
| JP | 2001-023760 | A | 1/2001 |
| JP | 2002-270343 | A | 9/2002 |
| JP | 2004-281260 | A | 10/2004 |
| JP | 2005-293895 | A | 10/2005 |
| JP | 2006-019286 | A | 1/2006 |
| JP | 2007-052945 | A | 3/2007 |
| JP | 2007-227830 | A | 9/2007 |
| JP | 2008-238926 | A | 10/2008 |
| JP | 2008-300050 | A | 12/2008 |
| JP | 2009-259831 | A | 11/2009 |
| JP | 2015-225738 | A | 12/2015 |
| JP | 2017-199565 | A | 11/2017 |
| JP | 2017-224397 | A | 12/2017 |
| JP | 2019-523036 | A | 8/2019 |

* cited by examiner

Cross Section X-X

PLANAR HEATING ELEMENT

BACKGROUND

Technical Field

The present invention relates to a planar heating element.

Description of the Related Art

A planar heating element includes a substrate, an electrode disposed on the substrate, and a resistor disposed on substrate and electrically connecting to the electrode and having a self-temperature control function (see Patent Document 1). This planar heating element is used as a seat heater for automobiles. When a person sits on a seat, a load is applied intensively to the point where the person sits, and the planar heating element is pulled and deformed. On the other hand, when the above load is removed, the planar heating element returns to its original form.

PATENT DOCUMENT

Patent document 1: JP 2002-270343 A

In the planar heating element as described above, if PET (polyethylene terephthalate) or the like is used as substrate and this substrate is thin, the planar heating element may be broken or cracked when the substrate is deformed by the load.

SUMMARY

One or more embodiments provide a planar heating element capable of suppressing the occurrence of breakage and cracking due to modification.

A planar heating element according to one or more embodiments comprises an insulating resin film and a heating portion that comprises a conductive circuit formed on the insulating resin film. The insulating film comprises missing portions that penetrate the insulating film and surround a specific point located on the insulating film. The missing portions comprise at least one of openings and recesses. The openings are located outside of a circular region of a predetermined radius centered at the specified point and are located within the conductive circuit. The recesses are recessed toward an inside of the insulating resin film and are located on an outer edge of the insulating resin film.

In the above-described embodiments, the missing portions may comprise both of the openings and the recesses.

In the above embodiments, the missing portions may comprise first missing portions that are located on one side of a virtual straight line passing through the specified point and extending along a first direction, and second missing portions that located on the other side of the virtual straight line. The first direction may be along a longitudinal direction of the insulating resin film or along a lateral direction of the insulating resin film. In the first direction, the specific point may be interposed between the first missing portions and between the missing portions.

In the above-described embodiments, the planar heating element may comprise a supporting layer that is composed of a woven fabric or a non-woven fabric. The supporting layer may be attached to at least one side of the insulating resin film on which the heating portion is formed.

In the above-described embodiments, a thickness of the insulating resin film may be less than 50 micrometer, and a thickness of the supporting layer may be larger than that of the insulating resin film.

In the above-described embodiments, the missing portion may comprise the openings. The conductive circuit may comprise a pair of electric supplying wires, and a fine wire having a line width narrower than a line width of the electric supplying wire. A longitudinal direction of the openings may be substantially parallel to an extending direction of the fine wire.

In the above-described embodiments, the missing portions may comprise the openings, and the openings may have an elongated shape.

In the above-described embodiments, the missing portions may comprise the recesses, and the recesses may be recessed toward the circular region.

In the above-described embodiments, the missing portion may include the recess, and the recesses may have a tapered shape toward the circular region.

In the above-described embodiments, the conductive circuit may comprises a pair of electric supplying wires, and heat-generating portions that are formed by densely accumulating fine wires having a line width narrower than a line width of the electric supplying wire. The heat-generating portions are electrically connected to the pair of electric supplying wires in parallel.

In the above-described embodiments, the heat-generating portion may comprise a first heat-generating portion having a planar shape in which the fine wire is folded back at the center and wound in a spiral shape. The center of the first heat-generating portion may be substantially coincident with the specified point.

In the above-described embodiments, the fine wire may comprise curved portions extending alongside each other through folded portions, and the heat-generating portion may comprise a second heat-generating portion having a planar shape in which the curved portions are concentrically arranged around the specific point.

In the above-described embodiments, the missing portion may comprises the openings. The openings may have an elongated shape. The longitudinal direction of the opening may be along a circumference of a virtual circle around the specified point.

In the above-described embodiments, the conductive circuit may comprise a pair of opposing wires facing each other; and a pair of electric supplying wires integrally formed with each pair of opposing wires. The heating portion may comprise a conductive resin portion formed on the insulating resin film so that covers the opposing wires. The conductive resin portion may be composed of a conductive resin having a higher electrical resistance value than that of the opposing wire. The conductive resin portion may comprise an intervening portion arranged between the opposing wires.

In the above-described embodiments, the heating portion may comprise conductive resin portions. The conductive resin portion may have mutually different planar shapes.

In the above-described embodiments, the missing portion may comprise the openings. The openings may have an elongated shape. The longitudinal direction of the openings may be substantially parallel to the longitudinal direction of the opposing wires.

In the above-described embodiments, the missing portion may comprise the openings. The openings may be formed inside the opposing wires.

In the above-described embodiments, the heating portion may comprise a gap interposed between the conductive resin portions. The longitudinal direction of the gap may be substantially perpendicular to the longitudinal direction of the opposing wires.

In the above-described embodiments, the heating portion may comprise the conductive resin portions, and the conductive resin portions may have mutually different thicknesses.

In the above-described embodiments, heating portion includes a plurality of conductive resin portion, and the plurality of conductive resin portion may be composed of materials that differ from each other.

A planar heating element according to one or more embodiments comprise an insulating resin film, a heating portion that comprises a conductive circuit formed on the insulating resin film, and a supporting layer that is composed of a woven fabric or a non-woven fabric and is attached to at least one side of the insulating resin film on which the heating portion is formed.

In the above-described embodiments, the insulating film may comprise missing portions that surround a specific point located on the insulating film and penetrate the insulating film. The missing portion may comprise at least one of openings and recesses. The openings may be located outside of a circular region of a predetermined radius centered at the specified point and are located within the conductive circuit. The recesses are recessed toward an inside of the insulating resin film and are located on an outer edge of the insulating resin film.

In the above-described embodiments, the insulating resin film may have both of the openings and the recesses.

In the above embodiments, the missing portions may comprise first missing portions that are located on one side of a virtual straight line passing through the specified point and extending along a first direction, and second missing portions that located on the other side of the virtual straight line. The first direction may be along a longitudinal direction of the insulating resin film or along a lateral direction of the insulating resin film. The specified point, in the first direction, may be interposed between the first missing portions and between the missing portions.

In the above-described embodiments, the missing portions may comprise the openings. The conductive circuit may comprise a pair of electric supplying wires and fine wires having a line width narrower than a line width of the electric supplying wire. The longitudinal direction of the openings may be substantially parallel to an extending direction of the fine wires.

In the above-described embodiments, the missing portions may comprise openings, and the openings may have an elongated shape.

In the above-described embodiments, the missing portions may comprise the recesses, and the recesses may be recessed toward the circular region.

In the above-described embodiments, the missing portions may comprise the recesses, and the recesses may have a tapered shape toward the circular region.

In the above-described embodiments, the conductive circuit may comprise a pair of electric supplying wires, and heat-generating portions that are formed by densely accumulating fine wires having a line width narrower than a line width of the electric supplying wire. The heat-generating portions may be electrically connected to the pair of electric supplying wires in parallel.

In the above-described embodiments, the heat-generating portion may comprise a first heat-generating portion having a planar shape in which the fine wire is folded back at the center and wound in a spiral shape. The center of the first heat-generating portion may be substantially coincident with the specified point.

In the above-described embodiments, the fine wire may comprise curved portions extending alongside each other through folded portions. The heat-generating portion may comprise a second heat-generating portion having a planar shape in which the curved portions are concentrically arranged around the specific point.

In the above-described embodiments, the missing portions comprise openings, and the opening may have an elongated shape. The longitudinal direction of the opening may be along a circumference of a virtual circle around the specified point.

In the above-described embodiments, the conductive circuit may comprise a pair of opposing wires facing each other; and a pair of electric supplying wires integrally formed with each pair of opposing wires. The heating portion may comprise a conductive resin portion formed on the insulating resin film so that covers the opposing wires. The conductive resin portion may be composed of a conductive resin having a higher electrical resistance value than that of the opposing wire. The conductive resin portion may comprise an intervening portion arranged between the opposing wires.

In the above-described embodiments, the heating portion may comprise conductive resin portions. The conductive resin portion may have mutually different planar shapes.

In the above-described embodiments, the missing portion may comprise the openings. The openings may have an elongated shape. The longitudinal direction of the openings may be substantially parallel to the longitudinal direction of the opposing wires.

In the above-described embodiments, the missing portion may comprise the openings. The openings may be formed inside the opposing wires.

In the above-described embodiments, the heating portion may comprise a gap interposed between the conductive resin portions. The longitudinal direction of the gap may be substantially perpendicular to the longitudinal direction of the opposing wires.

In the above-described embodiments, the heating portion may comprise the conductive resin portions, and the conductive resin portions may have mutually different thicknesses.

In the above-described embodiments, heating portion includes a plurality of conductive resin portion, and the plurality of conductive resin portion may be composed of materials that differ from each other.

In the above embodiments, a thickness of the insulating resin film may be less than 50 micrometer, a thickness of the supporting layer may be larger than that of the insulating resin film.

In the planar heating element according to one or more embodiments, the insulating resin film comprises at least one of the openings, and the recesses. The openings penetrate the insulating film, are located outside of a circular region of a predetermined radius centered at the specified point, are located within the conductive circuit, and penetrate the insulating film. The recesses are recessed toward the inside of the insulating resin film and are located on an outer edge of the insulating resin film so as to surround the specified point. As a result, when the planar heating element is deformed by a load, the stress generated in the planar heating element can be reduced by deforming the openings and the recesses. Therefore, the planar heating element in one or more embodiments can suppress the occurrence of breakage or cracking due to modification.

In addition, in the planar heating element according to one or more embodiments, because the supporting layer composed of the woven fabric or the nonwoven fabric is attached to the insulating resin film, the stresses generated in the planar heating element can be reduced by this supporting layer. Therefore, the planar heating element in one or more embodiments can suppress the occurrence of breakage or cracking due to modification.

DESCRIPTION OF THE EMBODIMENTS

Hereinafter, embodiments will be described with reference to the drawings.

First Example

Figure 1:
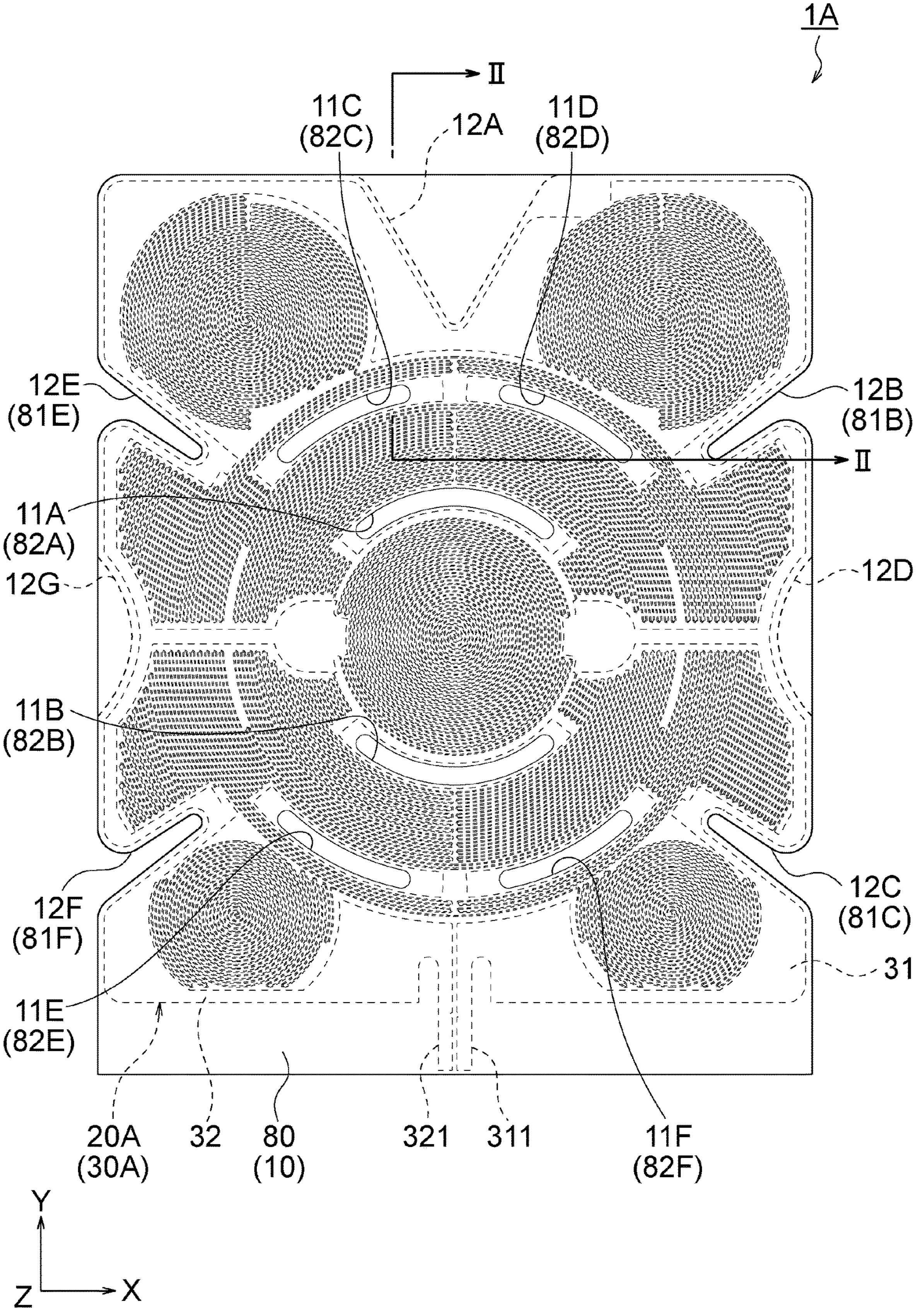
FIG. 1 is a plan view illustrating a planar heating element in a first example.
Figure 2:
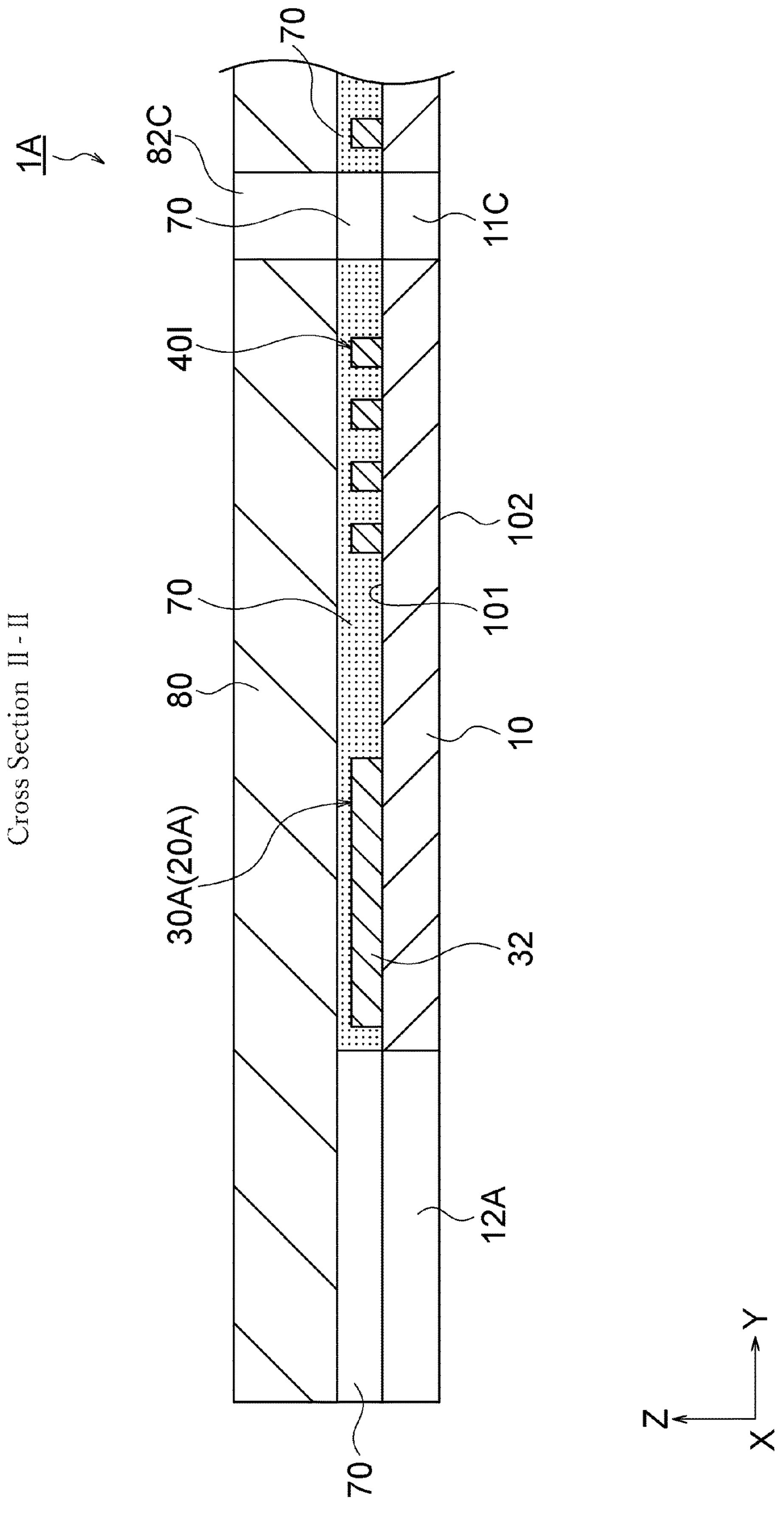
FIG. 2 is a cross-sectional view taken along the line II-II of FIG. 1.
Figure 3:
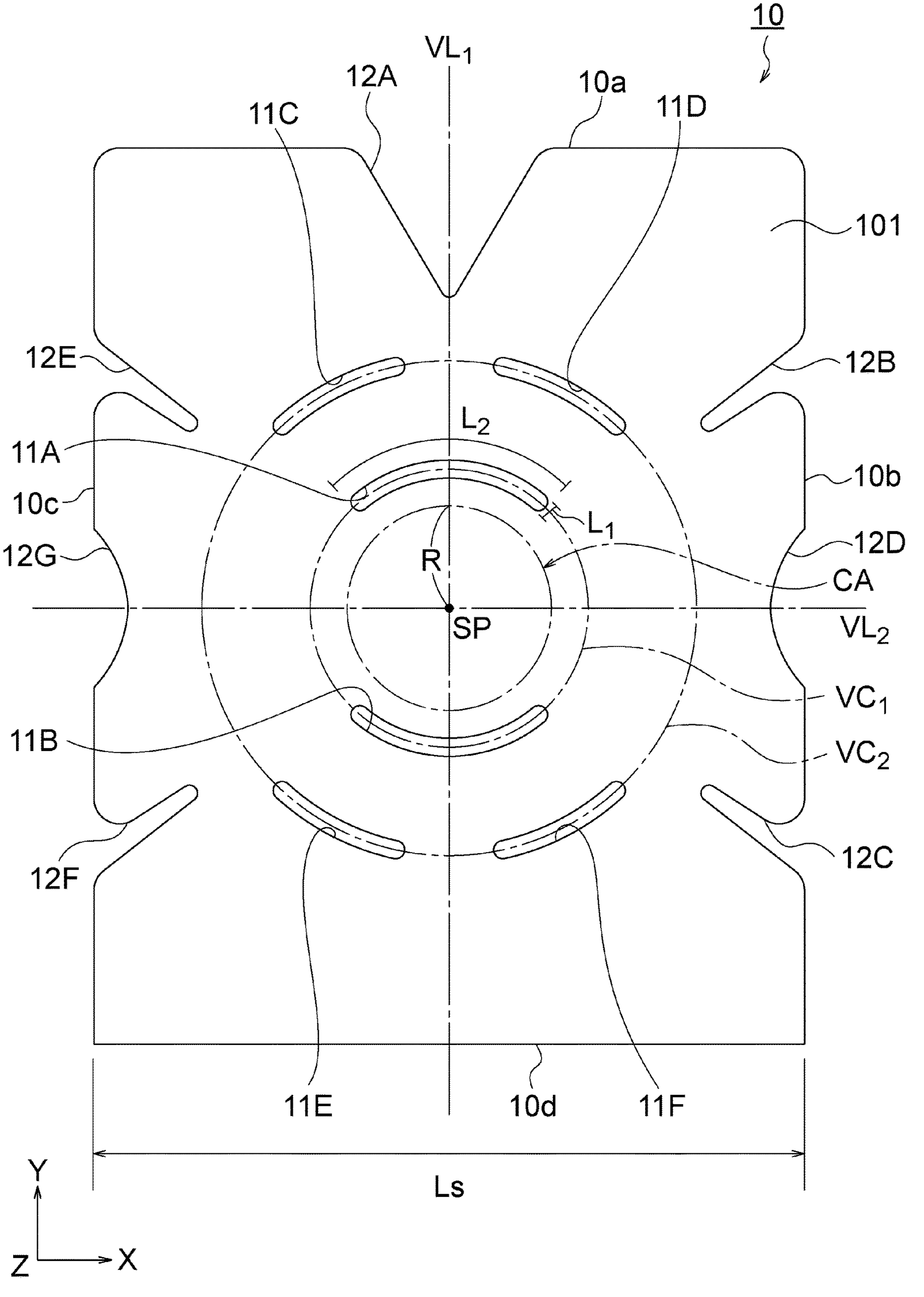
FIG. 3 is a plan view illustrating a resin film in the first example.
Figure 4:
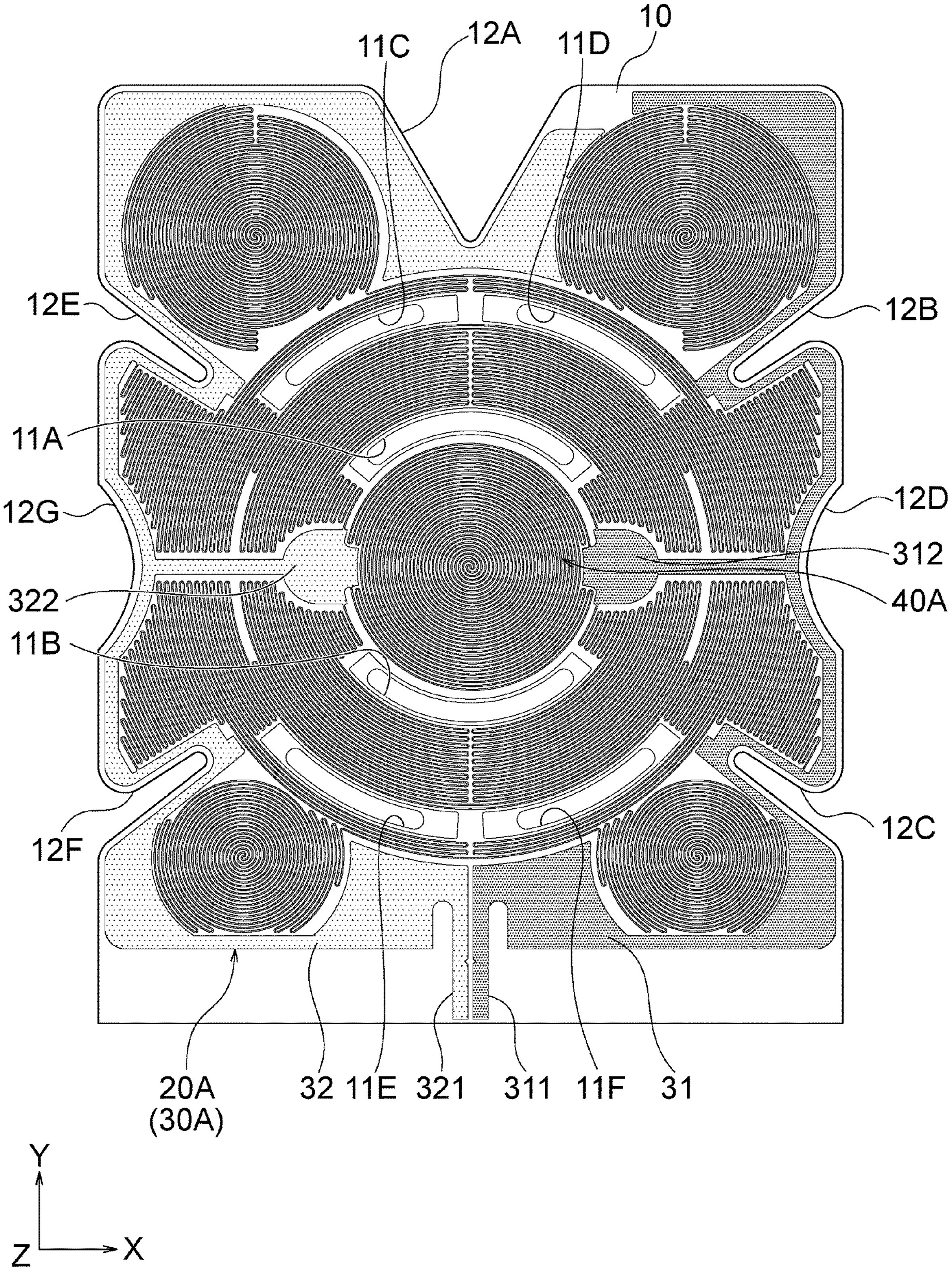
FIG. 4 is a plan view illustrating the resin film and a conductive circuit in the first example.
Figure 5:
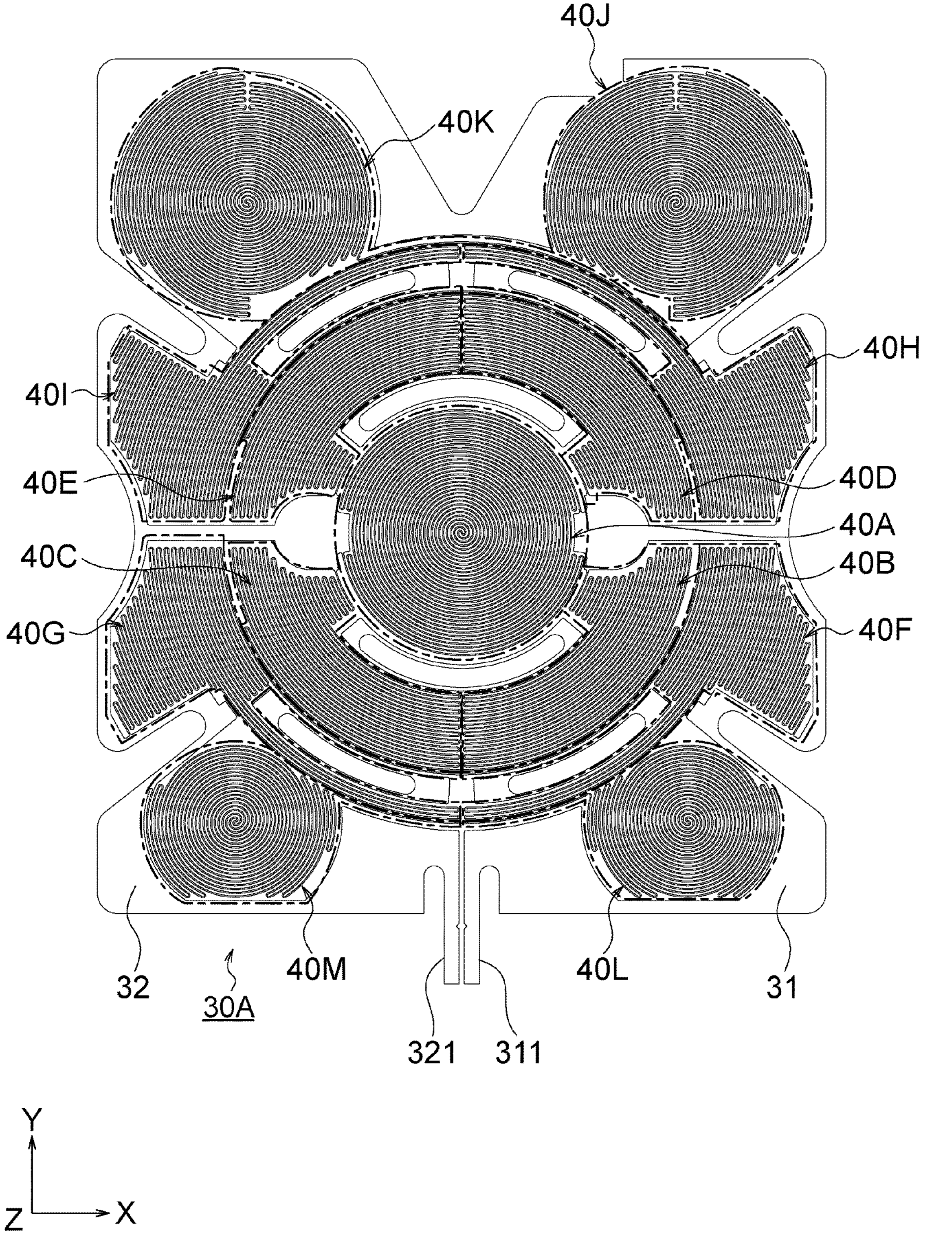
FIG. 5 is a plan view illustrating the conductive circuit in which heat-generating portions are sectioned in the first example.
Figure 6:
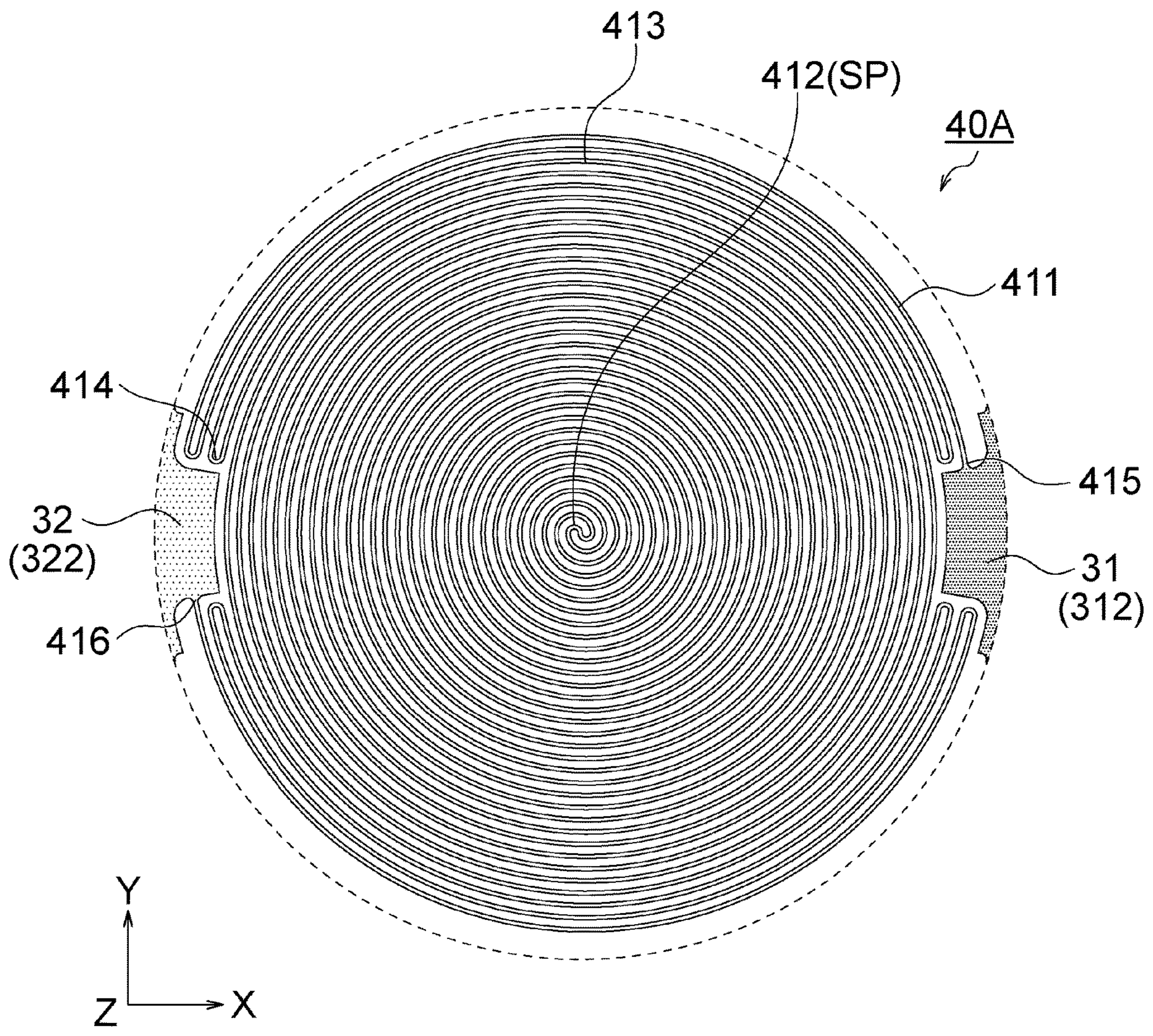
FIG. 6 is an enlarged plan view illustrating the heat-generating portion disposed on the center in the first example.
Figure 7:
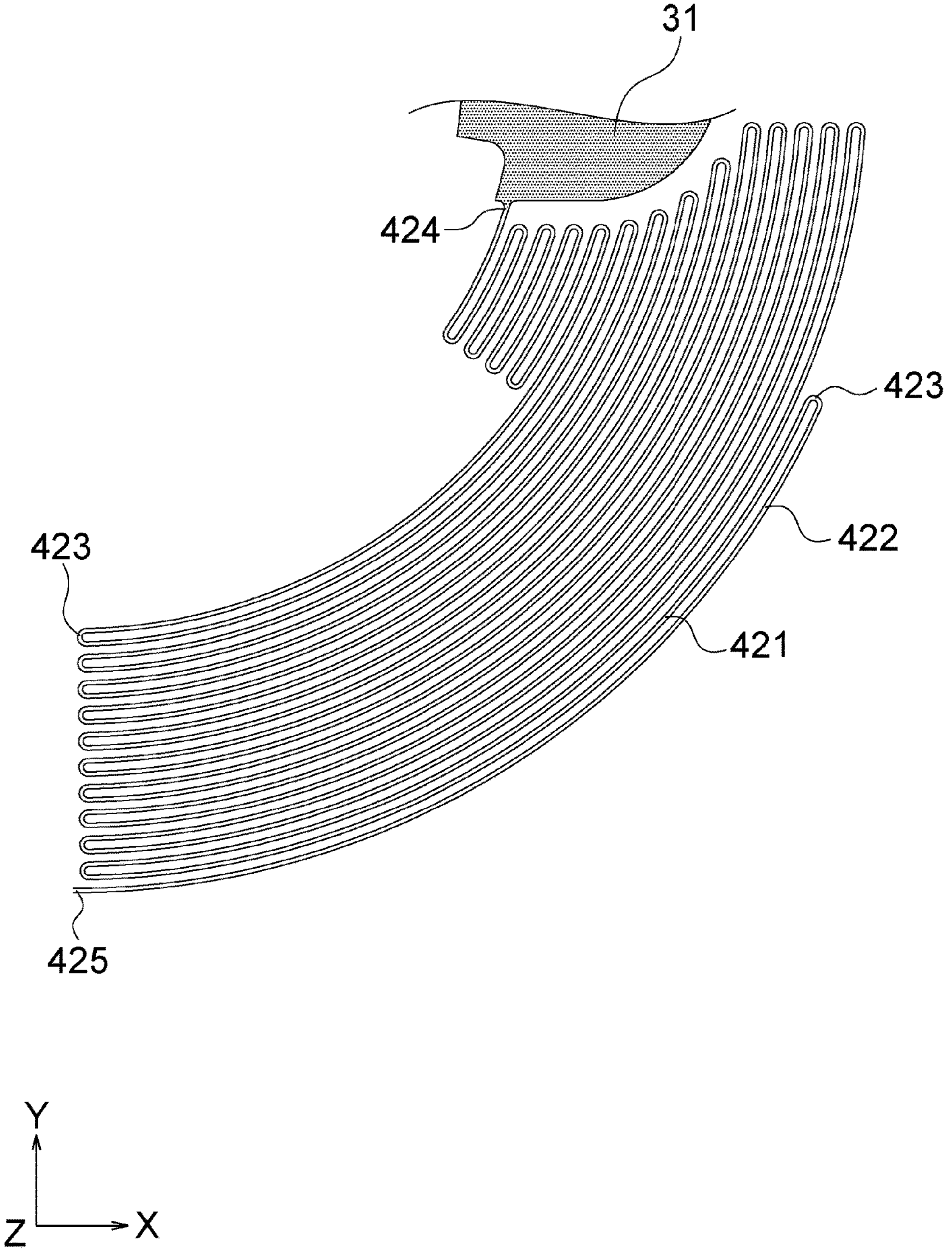
FIG. 7 is an enlarged plan view illustrating the heat-generating portion adjoining the heat-generating portion disposed on the center in the first example.
Figure 8:
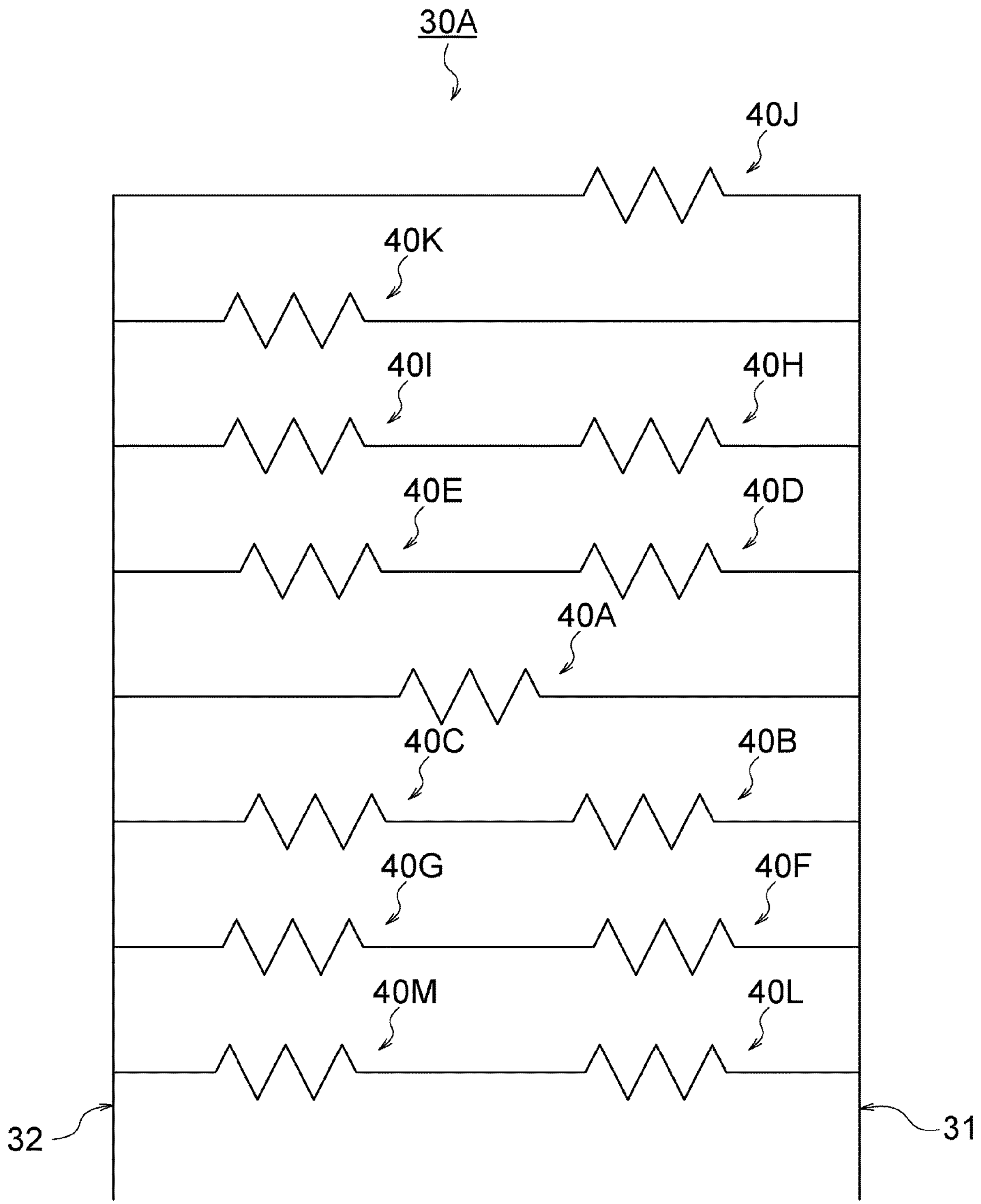
FIG. 8 is an equivalent circuit diagram of the conductive circuit in the first example.

FIG. 1 is the plan view illustrating the planar heating element in one or more embodiments. FIG. 2 is the cross-sectional view taken along the line II-II of FIG. 1. FIG. 3 is the plan view illustrating the resin film in one or more embodiments. FIG. 4 is the plan view illustrating the resin film and the conductive circuit in one or more embodiments. FIG. 5 is the plan view illustrating the conductive circuit in which heat-generating portions are sectioned in one or more embodiments. FIG. 6 is the enlarged plan view illustrating the heat-generating portion disposed on the center in one or more embodiments. FIG. 7 is the enlarged plan view illustrating the heat-generating portion adjoining the heat-generating portion disposed on the center in one or more embodiments. FIG. 8 is the equivalent circuit diagram of the conductive circuit in one or more embodiments.

As shown in FIGS. 1 and 2, a planar heating element 1A in one or more embodiments comprise a resin film 10, a heating portion 20A, an adhesive layer 70, and a supporting layer 80. This planar heating element 1A is not particularly limited, but is used as a seat heater for a vehicle such as an automobile, specifically, it is embedded in the seats of the vehicle. Incidentally, the object in which the planar heating element 1A is provided is not limited to the seat, for example, the planar heating element 1A may be embedded in an armrest. Further, the application of the planar heating element 1A is not particularly limited to the vehicle, and may be used, for example, in seats or beds used other than the vehicle.

The resin film 10 is a film composed of a resin material having an insulating property. The resin film 10 in this example corresponds to an example of "an insulating resin film" in one or more embodiments.

As shown in FIG. 3, the resin film 10 has a specified point SP on the upper surface 101. This specified point SP is the point (maximum load application point) at which the maximum load is applied on the upper surface 101 of the resin film 10 when the planar heating element 1A is used as the seat heater or the like. In one or more embodiments, the specified point SP is located at the center of the resin film 10 (the center of gravity). For example, when an occupant sits on the seat, the buttocks of the occupant press the planar heating element 1A. In this time, the point where the load due to the pressing is maximized on the upper surface 101 of the resin film 10 is the specified point SP.

The upper surface 101 of the resin film 10 comprises a circular region CA of a predetermined radius R around the above specified point SP. This circular region CA is an area where bending deformation hardly occurs when the load is applied to specified point SP and its vicinity. On the other hand, the area surrounding the circular region CA is an area where larger bending deformation occurs than the bending deformation occurring in the circular region CA when the above-mentioned load is applied. The radius R of the circular region CA is not particularly limited, may be $\frac{1}{10}$ times or more with respect to the length $L_s$ of the short side of the resin film 10 ($\frac{1}{10} \leq R/L_s$). Further, the radius R, with respect to the length $L_s$ of the short side of the resin film 10, it is preferable that the $\frac{1}{8}$ times or more ($\frac{1}{8} \leq R/L_s$), more preferably $\frac{1}{6}$ times or more ($\frac{1}{6} \leq R/L_s$). Further, the radius R of the circular region CA is not particularly limited, may be $\frac{1}{2}$ times or less with respect to the length $L_s$ of the short side of the resin film 10 ($R/L_s \leq \frac{1}{2}$).

A plurality (six in this example) of openings 11A-11F that penetrate from the upper surface 101 to the lower surface 102 (refer to FIG. 2) of the resin-film 10 are disposed outside the circular region CA. The openings 11A-11F are arranged concentrically with the circular region CA.

The number of the openings formed on the resin film 10 is not particularly limited to the above, as long as it is plural, can be arbitrarily set. The shape of the opening is not particularly limited to the shape described below. Furthermore, the arrangement of the openings in the resin film 10 is not also particularly limited to the arrangement described below, as long as it is disposed outside the circular region CA and within the conductive circuit 30A (described later) of heating portion 20A. Here, the term "disposed in conductive circuit 30A" means that the openings are disposed inside the area on the resin-film where the conductive circuit is formed.

The openings 11A, 11B are disposed along the circumference of a virtual circle $VC_1$ around the specified point SP and have an elongated shape that extends around the circumference of the circumference (that is, the longitudinal directions of the openings 11A, 11B are along the circumference). The longitudinal directions of the openings 11A, 11B are substantially parallel to the extending directions of the fine wires 411, 421 (described later, refer to FIGS. 6 and 7) of the conductive circuit 30A. Here, the virtual circle $VC_1$ is a concentric circle of the circular region CA and is a virtual circle having a radius greater than that of the circular region CA.

These openings 11A, 11B have a plane shape that is linearly symmetric with respect to virtual straight line $VL_1$. Also, these openings 11A, 11B are line-symmetrically arranged with respect to virtual straight line $VL_2$ and the circular region CA is intervening between these openings 11A, 11B. Here, the virtual straight line $VL_1$ is the virtual straight line that passes through the specified point SP and extends along the longitudinal direction of the resin film 10 (Y direction in the drawing). On the other hand, virtual straight line $VL_2$ is the virtual straight line that passes through the specified point SP and extends along the lateral direction of the plastic film 10 (X direction in the figure).

The openings 11C-11F are disposed outside the openings 11A, 11B. The openings 11C-11F are disposed along the circumference of the virtual circle $VC_2$ and have an elongated shape that extends along the circumference. The longitudinal directions of the openings 11C-11F are substantially parallel to the extending directions of the fine wires 411, 421 (described later, refer to FIGS. 6 and 7) of the conductive circuit 30A. Here, the virtual circle $VC_2$ is a concentric circle of the virtual circle $VC_1$ and is the virtual circle having a larger radius than that of the virtual circle $VC_1$.

The openings 11C, 11D are arranged in line symmetry with respect to virtual straight line $VL_1$ and has plane shapes that are line symmetric with respect to virtual straight line $VL_1$. The openings 11E, 11F are also linearly symmetrical with respect to virtual straight line $VL_1$ and have plane shapes that are line symmetric with respect to virtual straight line $VL_1$.

The openings 11C, 11E are arranged in line symmetry with respect to virtual straight line $VL_2$ and have plane shapes that are line symmetric with respect to virtual straight line $VL_2$. The openings 11D, 11F are also linearly symmetrical with respect to virtual straight line $VL_2$ and have plane shapes that are line symmetric with respect to virtual straight line $VL_2$.

Therefore, the opening 11C and the opening 11F are arranged point-symmetrically with respect to the specified point SP and have a planar shape that is point-symmetrical with respect to the specified point SP. The opening 11D and the opening 11E are also point-center arranged with respect to the specified point SP and have a planar shape that is point-symmetrical with respect to the specified point SP.

According to one or more embodiments, the openings 11A-11F have an elongated shape along the circumferences of the virtual circles $VC_1$, $VC_2$ centered on the specified point SP, so that when the planar heating element 1A is deformed by the load, the stresses generated in the resin film 10 can be effectively absorbed.

In one or more embodiments, the "elongated shape" means that the length $L_2$ in the longitudinal direction is longer than the length $L_1$ in the lateral direction ($L_2>L_1$), it is preferable that the ratio of the length $L_2$ in the longitudinal direction to the length $L_1$ in the lateral direction is more than twice ($L_2/L_1\geq2$), more preferably 4 times or more ($L_2/L_1\geq4$).

In one or more embodiments, the openings 11A-11F are located on the outer edge of the resin film 10 so as to surround the specified point SP.

Specifically, the openings 11A,11B,11D,11F are disposed on one side of the virtual straight line $VL_1$ extending in the longitudinal direction of the resin film 10 (+X direction side in the drawing). On one side, when the openings 11A,11B, 11D,11F and the specified point SP are projected along the X-direction onto the virtual straight line $VL_1$, the specified point SP is intervening during the openings 11A,11B and intervening during the openings 11D,11F. That is, in the longitudinal direction of the resin film 10, the specified point SP is interposed between the opening 11A,11B and interposed between the openings 11D,11F. Similarly, the specified point SP is interposed between the openings 11A,11F and the openings 11B,11D.

Similarly, the openings 11A-11C,11E are located on the other side of the virtual straight line $VL_1$ (−X side in the diagram). On the other hand, when the openings 11A-11C, 11E and the specified point SP are projected along the X-direction onto the virtual straight line $VL_1$, the specified point SP is intervening during the openings 11A,11B and intervening during the openings 11C,11E. That is, in the longitudinal direction of the resin film 10, the specified point SP is interposed between the openings 11A,11B and interposed between the openings 11C,11E. Similarly, the specified point SP is interposed between the openings 11A,11E and the openings 11B,11C.

The "longitudinal direction of the resin film 10" in one or more embodiments corresponds to an example of the "first direction" of one or more embodiments, and the openings 11A,11B,11D,11F in one or more embodiments correspond to examples of the "first missing portions" and the openings 11A-11C,11E in one or more embodiments correspond to examples of the "second missing portions" in one or more embodiments.

The relationship between the above-described specified point and the openings may be established in the lateral direction of the resin film. Although not particularly illustrated, the openings may be formed in the resin film so that the specified point is interposed between the openings disposed on the one side (+Y direction side) of the virtual straight line $VL_2$ and is also interposed between the openings disposed on the other side (−Y direction side) of the virtual straight line $VL_2$, in the lateral direction of the resin film. In this case, "the lateral direction" in one or more embodiments corresponds to an example of "the first direction" of one or more embodiments.

The resin film 10 of one or more embodiments has a rectangular planar shape having a first to fourth sides 10*a*-10*d*. Then, on the first to third sides 10*a*-10*c*, a plurality of (seven in this example) of recesses (slits) 12A-12G recessed toward the inner side of the resin film 10 are formed. In contrast, the recess is not formed on the fourth side 10*d*.

It is noted that the planar shape of the resin film 10 is not particularly limited to the above. The number of recesses formed on the resin film 10 is not particularly limited to the above, as long as there are a plurality of recesses, and can be set as desired. The shape of recess is not particularly limited to the shape described below. Furthermore, the arrangements of the recesses on the resin film 10 is not particularly limited to the arrangement described below, as long as the recesses are provided on the outer edge of the resin film 10 so as to surround the specified point SP. For example, the recesses may be formed on all of the sides 10*a*-10*d* of the resin film 10.

The recess 12A is formed on the first side 10*a*. This recess 12A is located on virtual straight line $VL_1$ and has a V-shape that tapers toward the circular region CA. The recess 12A preferably extends towards the specified point SP.

The recesses 12B-12D are formed on the second side 10*b*. The recesses 12B,12C have a U-shape that tapers toward the circular region CA and have a width that is less than the width of the recesses 12A. These recesses 12B,12C are line-symmetrically aligned with respect to the virtual straight line $VL_2$. The recesses 12B-12D preferably extend towards the specified point SP.

The recess 12D is located between the recesses 12B, 12C and on the virtual straight line $VL_2$. This recess 12D has an arc shape that tapers toward the specified point SP. The width of this recess 12D is greater than the widths of recesses 12B, 12C.

The recesses 12E-12G are formed on the third side 10*c*. The recess 12E, 12F, similar to the recesses 12B,12C described above, have a U-shape that tapers toward circular region CA and has the width that is less than the width of the recess 12A. The recesses 12E,12F are line-symmetrically aligned with respect to the virtual straight line $VL_2$. The recess 12E-12G preferably extend towards the specified point SP.

The recess 12G is located between the recesses 12E,12F and is located on the virtual straight line $VL_2$. The recess 12G has an arc shape that tapers toward the specified point SP, similar to recess 12D described above. The width of this recess 12G is greater than the width of the recesses 12E,12F.

The recesses 12B,12E are line-symmetrically arranged with respect to the virtual straight line $VL_1$. Similarly, the recesses 12C,12F are line-symmetrically arranged with respect to the virtual straight line $VL_1$.

The recess 12D,12G are also line-symmetrically arranged with respect to the virtual straight line $VL_1$.

In one or more embodiments, the recesses 12A-12G are provided on the first to third sides 10*a*-10*c* of the resin film 10 so as to surround the specified point SP.

Specifically, the recesses 12A-12D are disposed on one side of the virtual straight line $VL_1$ extending in the longitudinal direction (+X direction side in the drawing) of the resin film 10. On one side, when the recesses 12A-12D and the specified point SP are projected along the X direction onto the virtual straight line $VL_1$, the specified point SP is interposed between the recesses 12A,12C and is interposed between the recesses 12B,12C. That is, in the longitudinal direction of the resin film 10, the specified point SP is interposed between the recesses 12A,12C and is interposed between the recesses 12B, 12C.

Similarly, the recesses 12A,12E-12G are located on the other side (−X side in the diagram) of the virtual straight line $VL_1$. On the other hand, when the recesses 12A,12E-12G and the specified point SP are projected along the X direction onto virtual straight line $VL_1$, the specified point SP is interposed between the recesses 12A,12F and is interposed between the recesses 12E,12F. That is, in the longitudinal direction of the resin-based film 10, specified point SP is interposed between recess 12A,12F is interposed between recess 12E,12F.

In this case, "the longitudinal direction of the resin film 10" in one or more embodiments corresponds to an example of "the first direction" of one or more embodiments, the recesses 12A,12B,12D in one or more embodiments corresponds to examples of "the first missing portions" in one or more embodiments, and the recesses 12A,12E,12F in one or more embodiments correspond to examples of "the second missing portions" in one or more embodiments.

The above-described relationship between the specified point and the recesses may be established in the lateral direction of the resin film. Although not particularly illustrated, the recesses may be formed on the outer edge of the resin film so that the specified point is interposed between the recesses disposed on the one side (+Y direction side) of the virtual straight line $VL_2$ and is also interposed between the recesses disposed on the other side (−Y direction side) of the virtual straight line $VL_2$, in the lateral direction of the resin film. In this case, "the lateral direction" in one or more embodiments corresponds to an example of "the first direction" of one or more embodiments.

In this example, the specified point SP is surrounded by both the openings and the recesses. Specifically, the openings 11A,11B,11D,11F and the recesses 12A-12C are arranged on one side (the +X direction side in the drawings) of the virtual straight line $VL_1$, and the opening 11A-11C, 11E and the recesses 12A,12E-12G are arranged on the other side (−X direction side in the drawings) of the virtual straight line $VL_1$. Here, on one side, for example, when the opening 11D, the recess 12C, and the specified point SP are projected along the −X direction onto the virtual straight line $VL_1$, the specified point SP is interposed between the opening 11D and the recess 12C. On the other side, the opening 11C, when the recess 12F, and the specified point SP are projected along the X-direction on to the virtual straight line $VL_1$, the specified point SP is interposed between the opening 11C and the recess 12F. That is, in the longitudinal direction of the resin film 10, the specified point SP is interposed between the opening 11D and the recess 12C, and is interposed between the opening 11C and the recess 12F.

In this case, "the longitudinal direction of the resin film 10" in one or more embodiments corresponds to an example of "the first direction" of one or more embodiments, and the opening 11D and the recess 12C in one or more embodiments correspond to examples of "the first missing portions" in one or more embodiments, and the opening 11C and the recess 12F in one or more embodiments correspond to examples of "the second missing portions" in one or more embodiments.

The-above relationship between the specified point and the openings and the recesses may be established in the lateral direction of the resin film. Although not particularly illustrated, the openings and the recesses may be formed in the resin film so that the specified point is interposed between the openings and the recesses disposed on the one side (+Y direction side) of the virtual straight line $VL_2$ and is also interposed between the openings and the recesses disposed on the other side (−Y direction side) of the virtual straight line $VL_2$, in the lateral direction of the resin film. In this case, "the lateral direction" in one or more embodiments corresponds to an example of "the first direction" of one or more embodiments.

The thickness $T_1$ of the resin film 10 is not particularly limited, but is 10 micrometers to micrometers (10 micrometers$\leq T_1 \leq$50 micrometers). Further, it is preferable that thickness $T_1$ of the resin film 10 is 10 micrometers to 30 micrometers (10 micrometers$\leq T_1 \leq$30 micrometers). In this example, the thickness $T_1$ is 25 micrometers ($T_1$=25 micrometers).

As shown in FIGS. 2 and 4, the heating portion 20A containing the conductive circuit 30A is formed on the upper surface 101 of the resin film 10. The resin film 10 and the conductive circuit 30A are formed by patterning, such as etching or the like, the aluminum foil of the aluminum foil/PET composite film. This aluminum foil/PET composite film is a composite material in which the aluminum foil is bonded to a polyester film via an adhesive layer. Specific example of such aluminum foil/PET composite film is not particularly limited, but Alpet (registered trademark) manufactured by Panac Corporation can be exemplified. The material constituting the conductive circuit 30A is not limited to aluminum, may be an aluminum alloy, copper, copper alloy, or stainless steel or the like.

As shown in FIG. 5, the conductive circuit 30A comprises a pair of the electric supplying wires 31 and 32, and a plurality of (13 in this example) heat-generating portions 40A-40M. The pair of the electric supplying wires 31 and 32 is wires for supplying current to the heat-generating portions 40A-40M. The pair of the electric supplying wires 31 and 32 is disposed so as to face each other via the heat-generating portions 40A-40M on the resin film 10, and is electrically connected via the heat-generating portions 40A-40M. The heat-generating portions 40A-40M generate heat by resistively heated, when current supplied through the electric supplying wire 31 and 32 flows through the heat-generating portions 40A-40M.

The number of the heat-generating portions of the conductive circuit 30A is not particularly limited to the above, can be arbitrarily set as long as it is a plurality. The shape and the arrangement of the heat-generating portions are not particularly limited to the shape and arrangement described below.

As shown in FIG. 4, the electric supplying wire 31 extends along the outer periphery of the resin film 10 on one side (+X direction side) of the virtual straight line $VL_1$ (see FIG. 3), is curved along the recesses 12B-12D of the resin film 10. On the other hand, the electric supplying wire 32 extends along the outer periphery of the resin film 10 on the other side (−X direction side) of the virtual straight line $VL_1$ (see FIG. 3), is curved along the recesses 12A,12F-12G of the resin film 10. The pair of electric supplying wires 31 and 32 has terminals 311, 321 respectively, is connected to an external circuit (not shown) via the terminals 311, 321.

In one or more embodiments, although the fourth side 10*d* of the resin film 10 extends linearly along the X-direction, is not limited thereto, the fourth side 10*d* may extend along the electric supplying wires 31 and 32. In this case, on the fourth side 10*d* of the resin film 10, the recesses along the shapes of the terminals 311, 321 of the electric supplying wires 31 and 32 are formed. That is, the recesses are formed on all of the first to fourth sides 10*a*-10*d* of the resin film 10.

The widths $W_1$ of the electric supplying wires 31, 32 are not particularly limited but are greater than or equal to 3 mm ($W_1 \geq 3$ mm). Also, the thicknesses $T_2$ of the electric supplying wires 31 and 32 are not specifically limited to, may be 5 to 50 micrometers (5 micrometers$\leq T_2 \leq$50 micrometers).

As shown in FIG. 6, the heat-generating portion 40A formed on the center is formed by densely accumulating one fine wire 411 having a linewidth $W_2$ that is thinner than the linewidth $W_1$ of the electric supplying wires 31, 32 ($W_2 < W_1$). The heat-generating portion 40A has a planar shape in which the fine wire 411 is folded back at the center and wound in a spiral shape. The folded portion 412 is located at the center of the spiral shape and substantially overlaps the specified point SP. Thus, it is possible to suppress the modification and breakage of the fine wire 411 because the fine wire 411 has the spiral planar shape centered on the specified point SP, thereby improving the durability of the fine wire 411 against the load.

The heat-generating portion 40A also has a planar shape with curved portions 413 interconnected via the folded portion 414 on the outer of the-above spiral shape. The curved portions 413 of the fine wire 411 are arranged concentrically around the specified point SP. Because the curved portions 413 are arranged concentrically around the specified point SP, the durability of the fine wire 411 against the load can be improved, thereby preventing deformation and breakage of the fine wire 411.

The one end 415 of the fine wire 411 constituting the heat-generating portion 40A is connected to one of the electric supplying wire 31. Further, the other end 416 of the fine wire 411 is connected to the other electric supplying wire 32.

As shown in FIGS. 4 and 5, four heat-generating portions 40B-40E are arranged around the heat-generating portion 40A disposed on the center. The heat-generating portions 40B, 40C are arranged side by side along the circumference direction around the specified point SP. Then, the above-described opening 11B is interposed between the heat-generating portion 40A and the heat-generating portion 40B and between the heat-generating portion 40A and the heat-generating portion 40C. Similarly, the heat-generating portions 40D, 40E are arranged side by side along the circumferential direction. Then, the-above opening 11A is interposed between the heat-generating portion 40A and the heat-generating portion 40D and between the heat-generating portion 40A and the heat-generating portion 40E.

As shown in FIG. 7, the heat-generating portion 40B is formed by the dense concentration of the fine wire 421, similar to the heat-generating portion 40A. The heat-generating portion 40B has a planar shape with the curved portions 422 interconnected with each other via the folded portion 423. The curved portions 422 of the fine wire 421 are arranged concentrically around the specified point SP (see FIG. 3). Similar to the fine wire 411, it is possible to suppress modification and breakage of the fine wire 421 by the curved portions 422 arranged concentrically around the specified point SP. The one end 424 of the fine wire 421 of the heat-generating portion 40B is connected to one of the electric supplying wire 31, the other end 425 of the fine wire 421 is connected to the heat-generating portion 40C.

The linewidths $W_2$ of the fine wires 411, 421 may be a linewidth that provides enough resistance to allow the fine wires 411, 421 to generate heat when current flows through the fine wires 411,421. For example, the linewidths $W_2$ may be 0.1 mm-1.0 mm (0.1 mm$\leq W_2 \leq$1.0 mm). In one or more embodiments, the linewidth $W_2$ is not limited, may be 0.5 mm ($W_2$=0.5 mm).

Also, it is preferred that the pitch (distance between the fine wires 411) $P_1$ between the fine wires 411 may be about 1 to 5 times the linewidth $W_2$ of the fine wire 411 ($1 \leq W_2/P \leq 5$), and may be 0.5 mm in this example ($W_2/P_1=1$). The pitch $P_2$ between the fine wires 421 is the same ($P_2=P_1$). In this example, "dense" means that the fine wires having the line-width $W_2$ is folded back at the folded portion and the folded portions of the fine wire extend side by side in a pitched $P_1$.

In this example, the thicknesses $T_3$ of the fine wires 411, 421 are the same as the thicknesses $T_2$ of the electric supplying wires 31 and 32 ($T_3=T_2$).

As shown in FIGS. 4 and 5, the heat-generating portion 40C has a plane that is line symmetrical with the heat-generating portion 40B, centered on the virtual line $VL_1$. The heat-generating portions 40B, 40C are arranged line symmetrically with respect to the virtual line $VL_1$. One end of this heat-generating portion 40C is connected to the heat-generating portion 40B described above. Further, the other end of this heat-generating portion 40C is connected to the other electric supplying wire 32. That is, the heat-generating portions 40B, 40C are electrically connected in series between the electric supplying wires 31 and 32.

The heat-generating portion 40D has a planar shape that is line symmetrical with the heat-generating portion 40B, centered on virtual line $VL_2$. One end of this heat-generating portion 40D is connected to one of the electric supplying wires 31, the other end of the heat-generating portion 40D is connected to the heat-generating portion 40E.

The heat-generating portion 40E has a plane that is line symmetrical with the heat-generating portion 40D, centered on the virtual line $VL_1$. The heat-generating portions 40D, 40E are arranged line symmetrically with respect to the virtual line $VL_1$. One end of the heat-generating portion 40E is connected to the heat-generating portion 40D described above, the other end of the heat-generating portion 40E is connected to the other electric supplying wire 32. That is, the heat-generating portions 40D, 40E are electrically connected in series between the electric supplying wires 31 and 32.

Four heat-generating portions 40F-40I are further located around the heat-generating portions 40B-40E.

The heat-generating portions 40F, 40G are arranged next to each other along the circumferential direction around the specified point SP. The heat-generating portion 40F is located outside of the heat-generating portion 40B in the radial direction centered at the specified point SP. The heat-generating portion 40G is located outside the heat-generating portion 40C in the radial direction. Then, the above-described opening 11F is located inside the heat-generating portion 40F, and the opening 11E is located inside the heat-generating portion 40G.

Similarly, the heat-generating portions 40H, 40I are arranged next to each other along the circumferential direction. The heat-generating portion 40H is located outside the heat-generating portion 40D in the radial direction centered at the specified point SP. The heat-generating portion 40I is located outside the heat-generating portion 40E in the radial direction. Then, the above-described opening 11D is located in heat-generating portion 40H, and opening 11C is located in heat-generating portion 40I.

Similar to the heat-generating portion 40B described above, the heat-generating portion 40F is formed by densely accumulating fine wires, and has a planar shape with the curved portions connected to each other through the folded portions. One end of this heat-generating portion 40F is connected to one of the electric supplying wire 31, the other end of the heat-generating portion 40F is connected to the heat-generating portion 40G.

The heat-generating portion 40G has a plane that is line symmetrical with the heat-generating portion 40F, centered on the virtual line $VL_1$. The heat-generating portions 40F, 40G are arranged line symmetrically with respect to the virtual line $VL_1$. One end of this heat-generating portion 40G is connected to the heat-generating portion 40F. Further, the other end of the heat-generating portion 40D is connected to the other electric supplying wire 32. That is, the heat-generating portion 40F, 40G are electrically connected in series between the electric supplying wires 31 and 32.

The heat-generating portion 40H has a plane that is line symmetrical with the heat-generating portion 40F, centered on the virtual line $VL_2$. One end of the heat-generating portion 40H is connected to one of the electric supplying wire 31, the other end of the heat-generating portion 40H is connected to the heat-generating portion 40I.

The heat-generating portion 40I has a plane that is line symmetrical with the heat-generating portion 40H, centered on the virtual line $VL_1$. The heat-generating portions 40H, 40I are arranged line symmetrically with respect to the virtual line $VL_1$. One end of the heat-generating portion 40I is connected to the heat-generating portion 40H described above, the other end of the heat-generating portion 40I is connected to the other electric supplying wire 32. That is, the heat-generating portion 40H, 40I are electrically connected in series between the electric supplying wires 31 and 32.

The heat-generating portion 40J is located outside the heat-generating portion 40H in the radial direction centered at the specified point SP. The heat-generating portion 40J has a spiral planar configuration similar to the central heat-generating portion 40A described above. One end of the heat-generating portion 40J is connected to one of the electric supplying wire 31, the other end of the heat-generating portion 40J is connected to the other electric supplying wire 32.

The heat-generating portion 40K is located outside the heat-generating portion 40I in the radial direction centered at the specified point SP. The heat-generating portion 40I also has a spiral planar configuration similar to the heat-generating portion 40A described above. One end of the heat-generating portion 40I is connected to one of the electric supplying wire 31, the other end of the heat-generating portion 40I is connected to the other electric supplying wire 32.

The heat-generating portion 40L is located outside the heat-generating portion 40F in the radial direction centered at the specified point SP. The heat-generating portion 40L has a spiral planar configuration similar to the central heat-generating portion 40A described above. One end of this heat-generating portion 40L is connected to one of the electric supplying wire 31, the other end of the heat-generating portion 40L is connected to the heat-generating portion 40M.

The heat-generating portion 40M is located outside the heat-generating portion 40G in radial direction around the specified point SP. The heat-generating portion 40M has a plane that is line symmetrical with the heat-generating portion 40L, centered on the virtual line $VL_1$. The heat-generating portions 40L, 40M are arranged line symmetrically with respect to the virtual line $VL_1$. One end of the heat-generating portion 40M is connected to the heat-generating portion 40L described above, the other end of the heat-generating portion 40M is connected to the other electric supplying wire 32. That is, the heat-generating portions 40L, 40M are electrically connected in series between the electric supplying wires 31 and 32.

The conductive circuit 30A described above can be expressed by an equivalent circuit diagram as shown in FIG. 8. As shown in FIG. 8, in this conductive circuit 30A, the heat-generating portion 40A, the heat-generating portions 40B, 40C, the heat-generating portions 40D, 40E, the heat-generating portions 40F, 40G, the heat-generating portions 40H, 40I, the heat-generating portion 40J, the heat-generating portion 40K, and the heat-generating portions 40L, 40M are electrically connected to the electric supplying wires 31 and 32 in parallel. As a result, it is possible to improve the heating rate of the heat-generating portion 40A-40M compared to when the heat-generating portions are connected in series.

In one or more embodiments, the wire length of the heat-generating portion 40A, the wire length of the heat-generating portions 40B, 40C, the wire length of the heat-generating portions 40D, 40E, the wire length of the heat-generating portions 40F, 40G, the wire length of the heat-generating portions 40H, 40I, the wire length of the heat-generating portion 40J, the wire length of the heat-generating portions 40K, and the wire length of the heat-generating portions 40L, 40M are substantially the same. Thus, it is possible to align the calorific value of all heat-generating portions 40A-40M. Incidentally, the calorific value of the heat-generating portions may be different by varying the wire lengths of the heat-generating portions.

Incidentally, a circuit separate from conductive circuit 30A described above may be further formed on the resin film 10, the electronic components or the circuit board may be mounted on the resin film 10. Although not shown in the drawings, as an example, the temperature sensors may be disposed inside each of the heat-generating portion 40A-40M respectively, and wires connected to the respective temperature sensors may be formed on the resin-film 10 independently of the conductive circuit 30A. As another example, through-holes are formed in the enlarged portions 312, 322 of the electric supplying wires 31 and 32, the electrodes of the pair of the circuit boards are opposed via the through-holes, the pressure sensors can be formed by utilizing these through-holes. The pressure sensors may be connected directly to the enlarged portions 312, 322 described above. Alternatively, in the interior of the enlarged portions 312, 322, a region where the enlarged portions 312, 322 do not formed, pads for connecting the electronic components and the circuit board may be formed in the region.

Further, in one or more embodiments, although the openings of the resin film are formed between the heat-generating portions or within the heat-generating portions, but the openings are not limited thereto. The opening may be located anywhere inside the area where the conductive circuit is formed and outside the circular region CA. For example, the opening may be formed between the electric supplying wire and the heat-generating portion or inside the electric supplying wire.

As shown in FIGS. 1 and 2, the supporting layer 80 is attached to the resin film 10 via an adhesive layer 70 so as to cover the heating portion 20A. The supporting layer 80 is rigid enough to support the resin film 10. As shown in FIG. 1, the supporting layer 80 has a rectangular shape similar to the resin film 10, and covers the entire surface of the resin film 10, thereby imparting stiffness to the planar heating element 1A.

In this supporting layer 80, recesses are not formed at a position corresponding to the recesses 12A, 12D, 12G of the resin film 10, the supporting layer 80 covers the recess 12A, 12D, 12G of the resin film 10. In this way, the recesses 12A,12D,12G being wide are covered with the supporting layer 80, the planar heating element 1A can easily return to its original shape after it's deformation. The supporting layer 80 may not cover the recesses 12A,12D,12G.

In contrast, the supporting layer 80 has the recesses 81B, 81C, 81E, 81F corresponding to the recesses 12B, 12C, 12E,12F of the resin film 10. The recesses 81B, 81C, 81E, 81F of the supporting layer 80 are arranged so as to overlap the recesses 12B, 12C, 12E, 12F of the resin film 10, and have the same planar shape as the recesses 12B, 12C, 12E, 12F. For this reason, a recess 12B,12C,12E,12F that is narrower than recess 12A, 12D, 12G is not covered by supporting layer 80. The supporting layer 80 may cover the recesses 12B, 12C, 12E, 12F.

Further, the supporting layer 80 has openings 82A-82F corresponding to the openings 11A-11F of the resin film 10. The openings 82A-82F of the supporting layer 80 are arranged so as to overlap the openings 11A-11F of the resin film 10, and have the same planar shape as the openings 11A-11F. Although not particularly limited, the supporting layer 80 may not have the openings 82A-82F That is, the supporting layer 80 may cover the openings 11A-11F of the resin film 10.

The supporting layer 80 is not particularly limited, but a woven fabric or a nonwoven fabric may be used. It is possible to suppress the occurrence of bending or cracking in the resin film 10 by attaching the supporting layer 80 to the resin film 10.

Further, as the supporting layer 80, a woven fabric is particularly preferably used. Although the woven fabric is not particularly limited, a woven fabric woven with a weave by the stockinette stitch or the like can be exemplified. Because the woven fabric has stretchable, the use of the woven fabric as the supporting layer 80 can assist in returning to its original shape after the planar heating element 1A is deformed.

As the fibers constituting such a woven fabric or a nonwoven fabric, for example, resin fibers, glass fibers, and the like can be exemplified. As the resin fiber, for example, nylon fibers, rayon fibers, polyester fibers, polyamide fibers, vinyl fibers, aramid fibers, and the like can be exemplified.

The thickness $T_4$ of the supporting layer 80 can be larger ($T_1 \leq T_4$) than the thickness $T_1$ of the resin film 10, for example, 80 to 200 micrometers (80 micrometers$\leq T_4 \leq$200 micrometers).

The adhesive layer 70 is not particularly limited, but an adhesive containing a resin as a main component, a hot melt, a double-sided tape, or the like can be used as the adhesive layer 70. The adhesive layer 70 can also function as a resist layer for protecting the heating portion 20A. That is, the adhesive layer 70 can improve the weather resistance of the planar heating element 1A by providing the surface-protective and drip-proof performance of the heating portion 20A.

In this example, the adhesive layer 70 is formed on the entire surface of the resin film 10 Incidentally, the adhesive layer 70 may be formed over the entire circumference on the outer peripheral portion of the resin film 10, and may partially be formed in the inner region than the outer peripheral portion.

The supporting layer 80 and the adhesive layer 70 may not cover the terminals 311, 321 of the electric supplying wires 31 and 32. Further, the supporting layer 80 may be formed on the lower surface 102 (refer to FIG. 2) of the resin film 10. Furthermore, the supporting layer 80 may be formed on both the upper surface 101 and lower surface 102 of the resin film 10.

As described above, in the planar heating element 1A of one or more embodiments, because the opening 11A-11F are formed in the region in which deformation due to load is large in the resin film 10 (i.e., the region of the outer side of circular region CA), the stress due to deformation of the resin film 10 is reduced, the occurrence of breakage or cracking of the resin film 10 are suppressed. Further, the noise due to deformation of the resin film 10 is suppressed by the openings 11A-11F, because the stress in the resin film 10 is relieved.

Further, because the recesses 12A-12G are formed on the outer periphery of the resin film 10 so as to surround the specified point SP where load is easily applied in the resin film 10, the stress due to deformation around the specified point SP of the resin film 10 is reduced, the occurrence of breakage or cracking of the resin film 10 are suppressed. Further, the noise due to deformation of the resin film 10 is suppressed by the recesses 12A-12G, the stress of the resin film 10 is relieved.

Further, in the planar heating element 1A of one or more embodiments, because the supporting layer 80 composed of a woven fabric or a non-woven fabric is attached to the resin film 10, stresses due to deformation of the resin film 10 is reduced by the supporting layer 80, breakage or cracking of the resin film 10 are suppressed. Further, noise due to deformation of the resin film 10 is suppressed by supporting layer 80, because the stress in the resin film 10 is relieved.

In particular, according to one or more embodiments, when the thickness $T_1$ of the resin film 10 is 50 m or less, the resin film 10 is likely to be bended or cracked. However, because the openings 11A-11F or the recesses 12A-12G as described above are formed, it is possible to suppress the occurrence of bending or cracking of the resin film 10. Further, when the thickness $T_1$ of the resin film 10 is 50 m or less, the-above noise is also likely to occur. However, because the openings 11A-11F or the recesses 12A-12G as described above are formed, it is possible to suppress the generation of the noise.

Second Example

Figure 9:
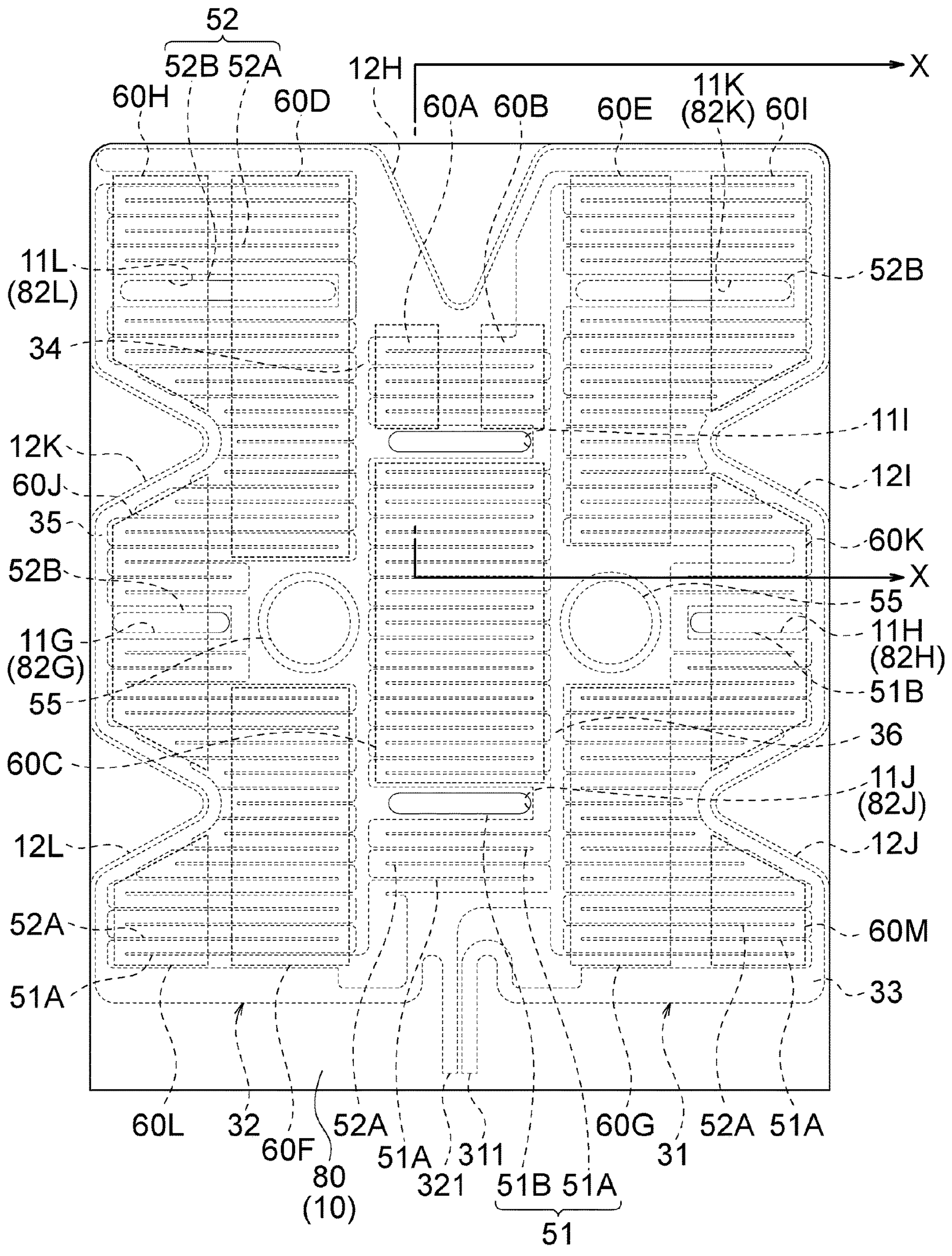
FIG. 9 is a plan view illustrating the planar heating element in a second example.
Figure 10:
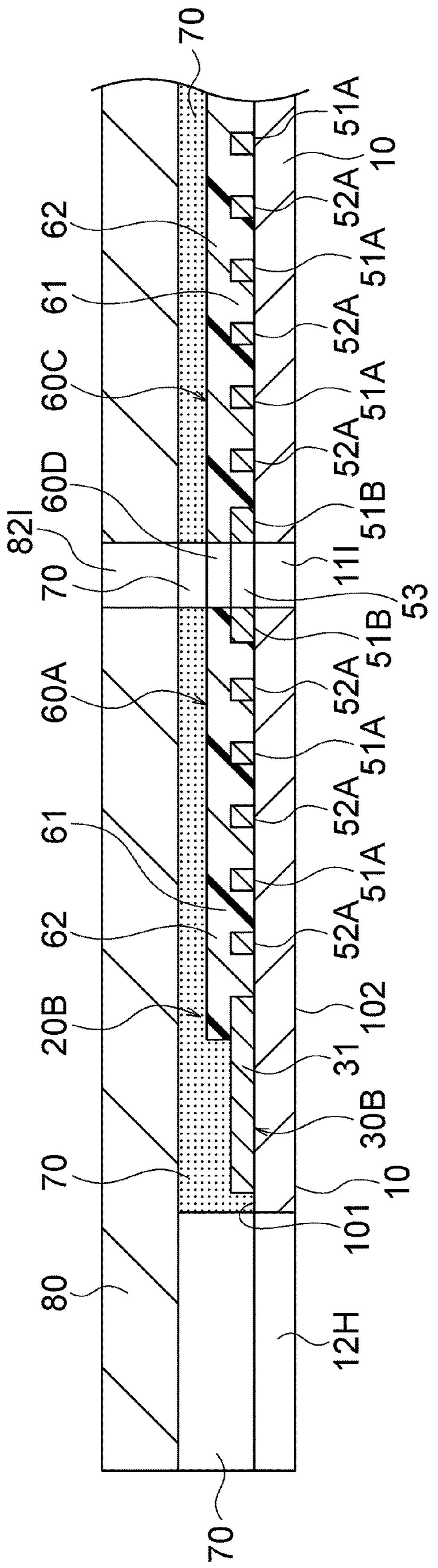
FIG. 10 is a cross-sectional view taken along the line X-X of FIG. 9.
Figure 11:
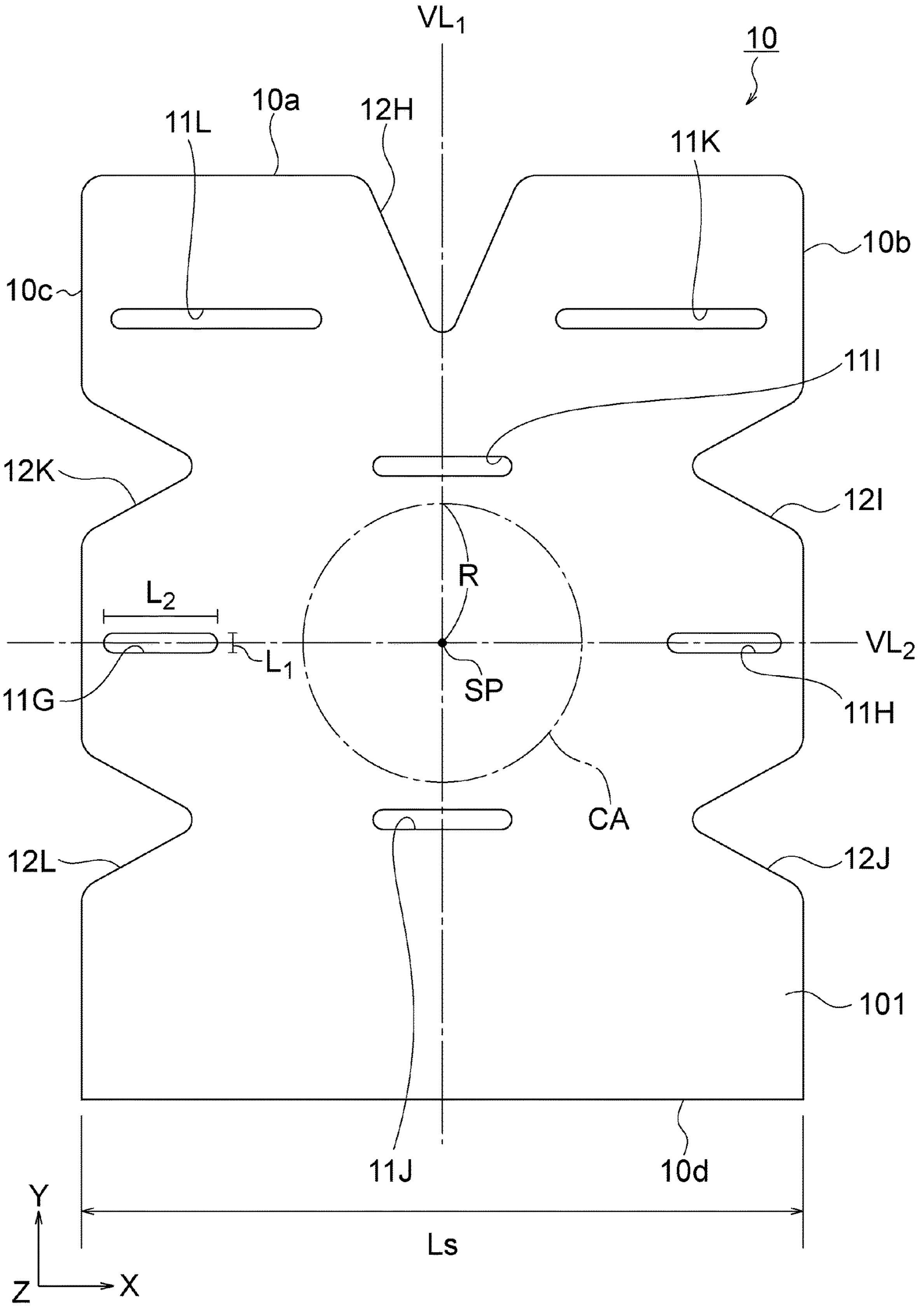
FIG. 11 is a plan view illustrating the resin film in the second example.
Figure 12:
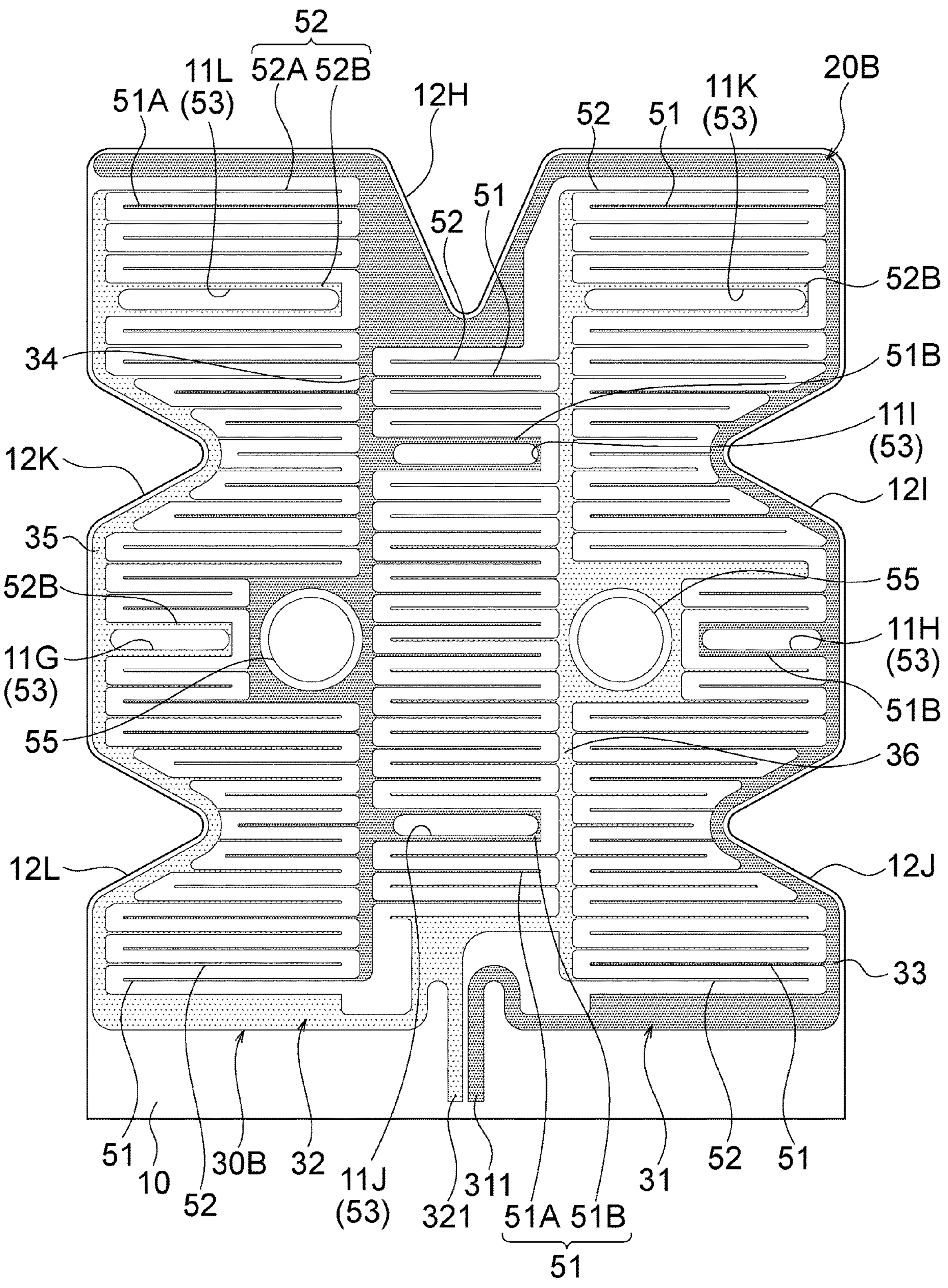
FIG. 12 is a plan view illustrating the resin film and the conductive circuit in the second example.
Figure 13:
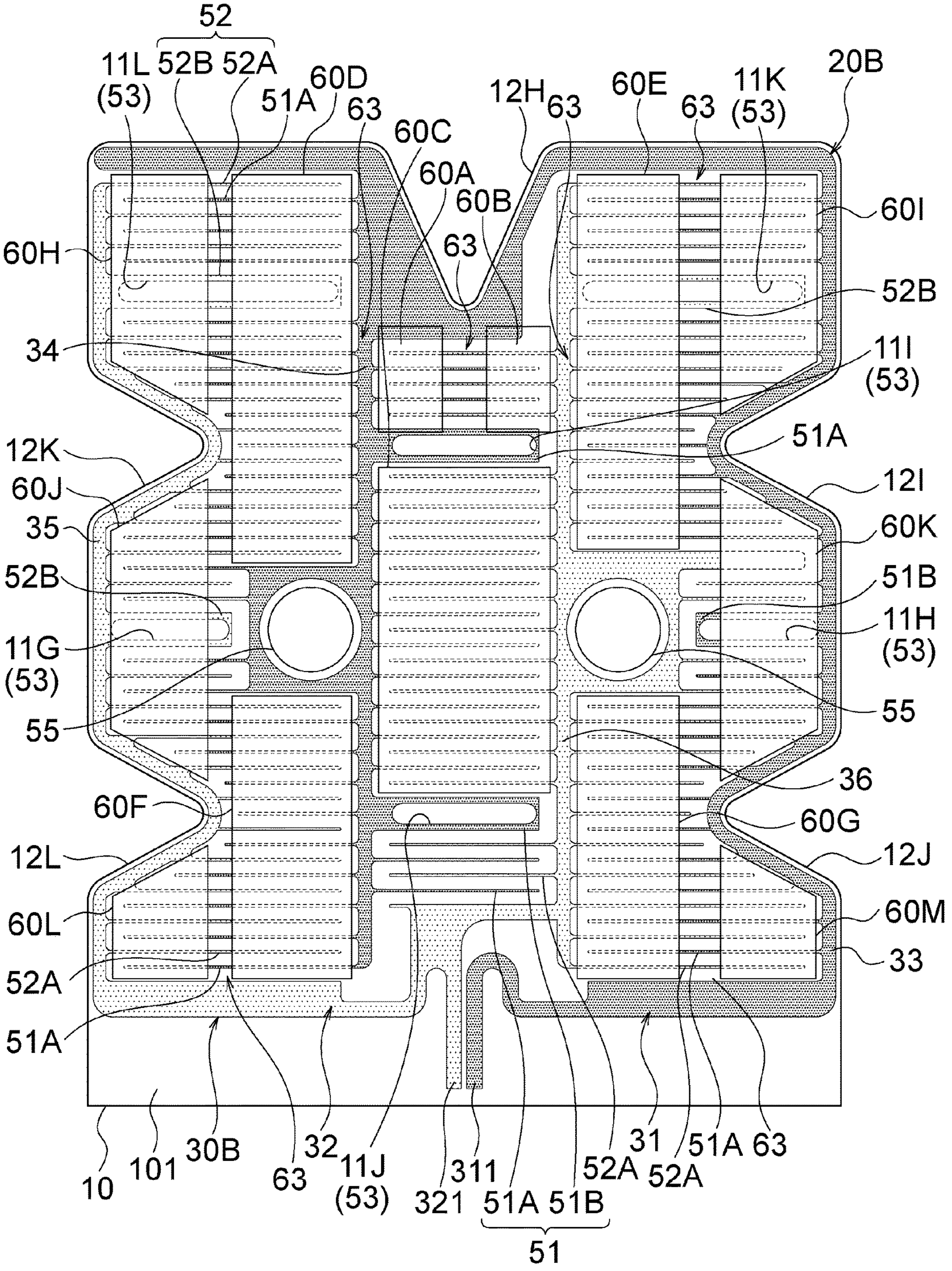
FIG. 13 is a plan view illustrating the resin film and the heating portion in the second example.
Figure 14:
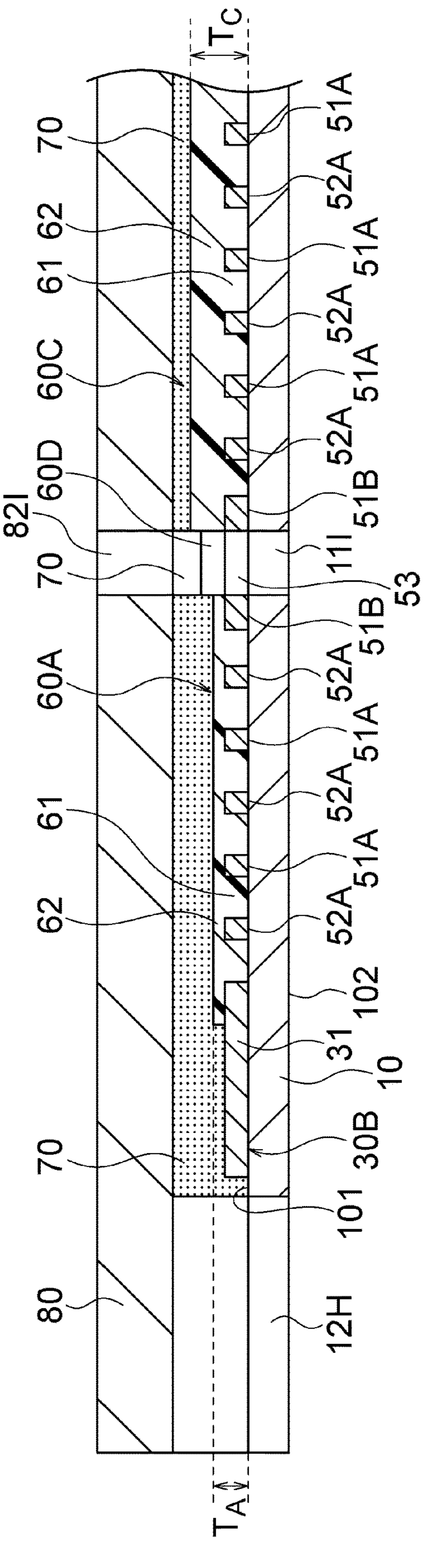
FIG. 14 is a cross-sectional view illustrating the modified conductive resin portion in the second example.

FIG. 9 is a plan view showing a planar heating element in one or more embodiments, FIG. 10 is a sectional view taken along X-X of FIG. 9, FIG. 11 is a plan view showing the resin film in one or more embodiments, FIG. 12 is a plan view showing the resin film and the conductive circuit in one or more embodiments, FIG. 13 is a plan view showing the resin film and the heating portion in one or more embodiments, FIG. 14 is a sectional view showing the modified conductive resin portion in one or more embodiments.

As shown in FIGS. 9 and 10, the planar heating element 1B in one or more embodiments comprises a resin film 10, a heating portion 20B, an adhesive layer 70, and a supporting layer 80. The planar heating element 1B is not particularly limited, but is used as a seat heater for a vehicle such as an automobile, specifically, it is used embedded in the seats of the vehicle. the object in which the planar heating element 1B is provided is not limited to the seat, for example, the planar heating element 1B may be embedded in an armrest. Further, the application of the planar heating element 1B is not particularly limited to the vehicle, and may be used, for example, in seats or beds used other than the vehicle.

The resin film 10 is a film made of a resin material having an insulating property. The resin film 10 in this example corresponds to an example of "the insulating resin film" in one or more embodiments.

As shown in FIG. 11, the resin film 10 has the specified point SP on the upper surface 101. This specified point SP is the point where the maximum load is applied on the upper surface 101 of the resin film 10 when the planar heating element 1B is used as the seat heater or the like. In one or more embodiments, the specified point SP is located at the center of the resin-film 10 (the center of gravity). For example, when an occupant is seated in the seat, the buttocks of the occupant press planar heating element 1B. In this case, on the upper surface 101 of the resin film 10, the point where the load due to the pressing is maximized is the specified point SP.

This circular region CA is an area where bending deformation hardly occurs when the load is applied to specified point SP and its vicinity. This circular region CA is an area where bending deformation hardly occurs when the load is applied to specified point SP and its vicinity. On the other hand, the area surrounding the circular region CA is an area where larger bending deformation occurs than the bending deformation occurring in the circular region CA when the above-mentioned load is applied. The radius R of the circular region CA is not particularly limited, may be 1/10 times or more with respect to the length $L_s$ of the short side of the resin film 10 ($1/10 \leq R/L_s$). Further, the radius R, with respect to the length $L_s$ of the short side of the resin film 10, it is preferable that the 1/8 times or more ($1/8 \leq R/L_s$), more preferably 1/6 times or more ($1/6 \leq R/L_s$). Further, the radius R of circular region CA is not particularly limited, with respect to the length $L_s$ of the short side of the plastic film 10 can be 1/2 times or less ($R/L_s \leq 1/2$).

The outer side of circular region CA, a plurality of (six in this example) openings 11G-11L are provided that penetrates from the upper surface 101 of the resin-film 10 to the lower surface 102 (refer to FIG. 2).

The number of opening formed on the resin-film 10 is not particularly limited to the above, as long as a plurality, can be arbitrarily set. The shape of opening is not particularly limited to the shape described below. Furthermore, the arrangement of opening on the resin-film 10 is also outer circular region CA, and, as long as it is disposed within conductive circuit 30B of heating portion 20B (described later), not particularly limited to the arrangement described below. Here, "arranged in conductive circuit 30A" means that conductive circuit is arranged inside the area where it is formed.

The four openings 11G-11J are located on the outer of circular region CA. The openings 11G-11J have an elongated shape extending along the lateral direction of the resin-film 10 (X direction in the drawing). The longitudinal directions of the openings 11G-11J are substantially parallel to the extending directions of the opposing wires 51 (described later), 52 (described later) (see FIG. 12) of the conductive circuit 30B.

The openings 11G, 11H have identical planar shapes and are linearly arranged with respect to virtual straight line $VL_1$. The circular region CA is interposed between these openings 11G, 11H. Here, the virtual straight line $VL_1$ passes through the specified point SP, is a virtual straight line extending along the longitudinal direction of the resin-film 10 (Y direction in the drawing).

The openings 11I, 11J have the same planar shapes to each other, the lengths of the longitudinal direction (X direction) of the openings 11I, 11J are longer than the lengths of the longitudinal direction (X direction) of the openings 11G, 11H. Also, the openings 11I, 11J are linearly arranged with respect to the virtual straight line $VL_2$ and the circular region CA is intervening during these openings 11I, 11J. Here, the virtual straight line $VL_2$ is a virtual straight line extending along the lateral direction (X direction in the figure) of the plastic film 10 as well as passing through the specified point SP.

Two openings 11K, 11L are arranged on the +Y-side of these openings 11G-11J. The openings 11K, 11L have the same planar shapes to each other, the lengths of the longitudinal direction (X direction) of the openings 11K, 11L are longer than the lengths of the longitudinal direction of the openings 11G-11J (X direction). The openings 11K, 11L are line-symmetrically arranged with respect to the virtual straight line $VL_1$.

In one or more embodiments, the "narrow length" means that the length $L_2$ in the longitudinal direction is longer than the length $L_1$ in the shorter direction ($L_2 > L_1$). It is preferable that the ratio of the length $L_2$ in the longitudinal direction to the length $L_1$ in the shorter direction is more than twice ($L_2/L_1 \geq 2$), more preferably 4 times or more ($L_2/L_1 \geq 4$).

In one or more embodiments, the openings 11G-11L are provided on the outer side of the circular region CA of the resin-film 10 so as to surround the specified point SP.

Specifically, the openings 11H-11K are disposed on one side of the virtual straight line $VL_1$ extending in the longitudinal direction of the resin-film 10 (+X-direction side in the drawings). On one side, when the openings 11H-11K and specified point SP are projected along the X-direction onto the virtual straight line $VL_1$, the specified point SP intervenes during the openings 11I, 11J and intervenes during the openings 11J, 11K. That is, in the longitudinal direction of the resin-based film 10, the specified point SP is interposed between the openings 11I, 11J, and is interposed between the openings 11J, 11K.

Similarly, the openings 11G, 11I, 11J, 11L are disposed on the other side of the virtual straight line $VL_1$ (−X side in the drawings). On the other hand, when the openings 11G, 11I, 11J, 11L and the specified point SP are projected along the X-direction onto the virtual straight line $VL_1$, the specified point SP intervenes between the openings 11I, 11J, and intervenes between the openings 11J, 11L. That is, in the longitudinal direction of the resin-based film 10, the specified point SP is interposed between the openings 11I, 11J, and is interposed between the opening 11J, 11L.

The "longitudinal direction of the resin film 10" in one or more embodiments corresponds to an example of the "first direction" of one or more embodiments, and the openings 11H-11K in one or more embodiments correspond to examples of the "first missing portion" and the openings 11G, 11I, 11J, 11L in one or more embodiments correspond to examples of the "second missing portion" in one or more embodiments.

The above-described relationship between specified point and opening may be established in the lateral direction of the resin-film. Although not particularly illustrated, the openings may be formed in the resin-film so that the specified point is interposed between the openings disposed on the one side (+Y direction side) of the virtual straight line $VL_2$ and is also interposed between the recesses disposed on the other side (−Y direction side) of the virtual straight line $VL_2$, in the lateral direction of the resin film. In this case, "the lateral direction" in one or more embodiments corresponds to an example of "the first direction" of one or more embodiments.

The resin-film 10 of one or more embodiments has a rectangular planar shape having a first to fourth sides 10*a*-10*d*. Then, on the first to third sides 10*a*-10*c*, the plurality (five in this example) of the recesses (slits) 12H-12L recessed toward the inside of the resin film 10 are formed. In contrast, the recess is not formed on the fourth side 10*d*.

Note that the planar shape of the resin-film 10 is not particularly limited to the above. The number of recesses formed on the resin film 10 is not particularly limited to the above, as long as there are a plurality of the recesses, and can be set as desired. The shape of recess is not particularly limited to the shape described below. Furthermore, the arrangements of the recesses on the resin film 10, as long as the recesses are provided on the outer periphery of the resin-film 10 so as to surround specified point SP, are not particularly limited to an arrangement described below. For example, the recesses may be formed on all sides 10*a*-10*d* of the resin-film 10.

The recess 12H is formed on the first side 10*a*. This recess 12H is located on the virtual straight line $VL_1$ and has a V-shape that tapers toward the specified point SP.

The recesses 12I, 12J are formed on the second side 10*b*, and have a V-shape which tapers toward the inside of the resin-film 10. These recesses 12I, 12J are line-symmetrically aligned with respect to the virtual straight line $VL_2$.

The recesses 12K, 12L are formed on the third side 10*c*, and have a V-shape which tapers toward the inside of the resin-film 10. These recesses 12I, 12J are line-symmetrically aligned with respect to the virtual straight line $VL_2$.

The recesses 12I, 12K are line-symmetrically arranged with respect to the virtual straight line $VL_1$. Similarly, the recesses 12J, 12L are linearly aligned with respect to the virtual straight line $VL_1$.

In one or more embodiments, the recesses 12H-12L are provided on the first to third sides 10*a*-10*d* of the resin-film 10 so as to surround the specified point SP.

Specifically, the recesses 12H-12J are disposed on one side of the virtual straight line $VL_1$ extending in the longitudinal direction of the resin-film 10 (+X direction side in the drawing). On one side, when the recesses 12H-12J and the specified point SP are projected along the X direction onto the virtual straight line $VL_1$, the specified point SP is interposed between the recesses 12H, 12J and the recesses 12I, 12J. That is, in the longitudinal direction of the resin-based film 10, the specified point SP is interposed between the recesses 12H, 12J, and is interposed between the recesses 12I, 12J.

Similarly, the recesses 12H, 12K, 12L are located on the other side of the virtual straight line $VL_1$ (−X side in the diagram). On the other hand, when the recesses 12H, 12K, 12L and the specified point SP are projected along the X-direction onto the virtual straight line $VL_1$, the specified point SP is interposed between the recesses 12H, 12L and the recesses 12K,12L. That is, in the longitudinal direction of the resin-based film 10, the specified point SP is interposed between the recesses 12H, 12L, and is interposed between the recesses 12K, 12L.

In this case, "the longitudinal direction of the resin film 10" in one or more embodiments corresponds to an example of "the first direction" of one or more embodiments, the recesses 12H, 12I, 12J in one or more embodiments correspond to examples of "the first missing portion" in one or more embodiments, and the recesses 12H, 12K, 12L in one or more embodiments correspond to examples of "the second missing portion" in one or more embodiments.

The above-described relationship between specified point and recess may be established in the lateral direction of the resin-film. Although not particularly illustrated, the recesses may be formed on the outer edge of the resin film so that the specified point is interposed between the recesses disposed on the one side (+Y direction side) of the virtual straight line $VL_2$ and is also interposed between the recesses disposed on the other side (−Y direction side) of the virtual straight line $VL_2$, in the lateral direction of the resin film. In this case, "the lateral direction" in one or more embodiments corresponds to an example of "the first direction" of one or more embodiments.

In this example, the specified point SP is surrounded by both of the openings and the recesses. Specifically, the openings 11H-11K and the recesses 12H-12J are disposed on one side of the virtual straight line $VL_1$ (+X direction side in the drawings), and the openings 11G, 11I, 11J, 11L and the recesses 12H, 12K, 12L are disposed on the other side of the virtual straight line $VL_1$ (−X direction side in the drawings). Here, on one side, for example, when the opening 11K, the recess 12J, and the specified point SP are projected onto the virtual straight line $VL_1$, the specified point SP is interposed between the opening 11K and the recess 12J. On the other side, for example, when the opening 11L, the recess 12L, and the specified point SP are projected onto a virtual straight line $VL_1$, the specified point SP is interposed between the opening 11L and the recess 12L. That is, in the longitudinal direction of the resin-based film 10, the specified point SP is interposed between the opening 11K and the recess 12J, is interposed between the opening 11L and the recess 12L.

In this case, "the longitudinal direction of the resin film 10" in one or more embodiments corresponds to an example of "the first direction" of one or more embodiments, and the opening 11K and the recess 12J in one or more embodiments correspond to examples of "the first missing portion" in one or more embodiments, and the opening 11L and the recess 12L in one or more embodiments correspond to examples of "the second missing portion" in one or more embodiments.

The relationship between the specified point and the opening and the recess may be established in the lateral direction of the resin-film. Although not particularly illustrated, the openings and the recesses may be formed in the resin film so that the specified point is interposed between the openings and the recesses disposed on the one side (+Y direction side) of the virtual straight line $VL_2$ and is also interposed between the openings and the recesses disposed on the other side (−Y direction side) of the virtual straight line $VL_2$, in the lateral direction of the resin film. In this case, "the lateral direction" in one or more embodiments corresponds to an example of "the first direction" of one or more embodiments.

The thickness $T_1$ of the resin-film 10 is not particularly limited, but is 10 micrometers to 50 micrometers (10 micrometers$\leq T_1 \leq$50 micrometers). Further, it is preferable that the thickness $T_1$ of the resin-film 10 is 10 micrometers to 30 micrometers (10 micrometers$\leq T_1 \leq$30 micrometers). In this example, the thickness $T_1$ is 25 micrometers ($T_1$=25 micrometers).

As shown in FIGS. 10, 12, and 13, the heating portion 20B is formed on the upper surface 101 of the resin-based film 10. The heating portion 20B includes a conductive circuit 30B and a plurality of (13 in this example) conductive resin portions 60A-60M.

The conductive circuit 30B includes a pair of the electric supplying wires 31 and 32, a plurality of the opposing wires 51 and 52, and pads 55, as shown in FIG. 12. A pair of the electric supplying wires 31 and 32 are wires for supplying current to the conductive resin portions 60A-60M via the opposing wires 51 and 52. A pair of the electric supplying wires 31 and 32 are disposed so as to face each other over the opposing wires 51 and 52 and the conductive resin portions 60A-60M on the resin-film 10, and are electrically connected through the opposing wires 51 and 52 and the conductive resin portions 60A-60M.

One electric supplying wire 31 includes a main wire 33 and a sub wire 34. The main wire 33 extends along the outer periphery of the resin film 10 on one side (+X direction side) of the virtual straight line $VL_1$ (see FIG. 11), it is curved along the recesses 12H-12J of the resin-film 10. The sub wire 34 branches from the main wire 33 in the vicinity of the recess 12H, and extends along −Y direction in the drawing to the vicinity of the other electric supplying wire 31.

The other electric supplying wire 32 also includes the main wire 35 and the sub wire 36. The main wire 35 extends along the outer periphery of the resin-film 10 on the other side (−X side) of the virtual straight line $VL_1$ (see FIG. 11), is curved along the recesses 12H, 12K, 12L of the resin-film 10. The sub wire 36 is connected to an end of the main wire 35, extends in the +Y direction in the drawing to the vicinity of one of the electric supplying wire 31. A pair of the electric supplying wires 31 and 32, respectively, has terminals 311, 321, is connected to an external circuit (not shown) via the terminals 311, 321.

In one or more embodiments, the fourth side 10*d* of the resin-film 10, but extends linearly along the X direction, is not limited thereto, the fourth side 10*d* may extend along the electric supplying wires 31 and 32. In that case, on the fourth side 10*d* of the resin-film 10, the recesses along the shapes of the terminals 311, 321 of the electric supplying wires 31 and 32 are formed. That is, the recesses are formed on all of the first to fourth sides 10*a*-10*d* of the resin-film 10.

The widths $W_1$ of the electric supplying wires 31, 32 are not particularly limited but are greater than or equal to 3 mm ($W_1 \geq$3 mm). Also, thicknesses $T_2$ of the electric supplying wires 31 and 32 are not specifically limited to 5-50 micrometers (5 micrometers$\leq T_2 \leq$50 micrometers).

From the main wire 33 and the sub wire 34 of one of electric supplying wire 31, the opposing wires 51 are branched. The opposing wires 51 are arranged at substantially equal intervals along the longitudinal direction (Y direction in the drawing) of the resin-film 10. Further, the opposing wire 51 extends in the lateral direction (X direction in the drawing) of the resin-film 10, and protrudes from the electric supplying wire 31 in a comb-like shape toward the electric supplying wire 32.

The opposing wire 51 contains two types of the opposing wires 51A, 51B. The opposing wire 51A is a thin wire (fine wire) that accounts for the bulk of the opposing wire 51. In contrast, the opposing wire 51B is disposed at a position corresponding to the openings 11H-11J in the upper surface 101 of the resin-film 10. The width (the total width including the opening in the Y-direction in the drawing) of the opposing wire 51B is thicker than the width of the opposing wire 51A, and the opening 53 is formed inside the opposing wire 51B. The opening 53 overlaps the openings 11H-11J of the resin-film 10 described above.

From the main wire 35 and the sub wire 36 of the other electric supplying wire 32, the opposing wires 52 are branched. The opposing wires 52 are arranged at substantially equal intervals along the longitudinal direction (Y direction in the drawing) of the resin-film 10. Further, the opposing wire 52 extends in the lateral direction (X direction in the drawing) of the resin-film 10, and protrudes from the electric supplying wire 32 toward the electric supplying wire 31 in the comb-like shape.

The opposing wire 52 contains two types of the opposing wires 52A, 52B. The opposing wire 52A is a thin wire (fine wire) that accounts for the bulk of the opposing wire 52. In contrast, the opposing wire 52B is disposed at a position corresponding to the openings 11G, 11K, 11L in the upper surface 101 of the resin-film 10. The width of the opposing wire 52B (total width including opening in the Y-direction in the diagram) is thicker than the width of the opposing wire 52A. The opening 54 is formed inside the opposing wire 52B. The opening 54 of this opposing wire 52B overlaps the openings 11G, 11K, 11L of the above-mentioned resin-film 10.

Then, the opposing wire 51 and the opposing wire 52 are arranged alternately, are opposed to each other at predetermined intervals. Incidentally, a predetermined distance is also formed between the tip of the opposing wire 51 and the electric supplying wire 32, and a predetermined distance is also formed between the tip of opposing wire 52 and electric supplying wire 31.

The planar shapes of the electric supplying wires 31, 32 and the opposing wires 51, 52 are not particularly limited to the above, the planar shapes can be arbitrarily set. For example, if the interval of the opposing wire 51, 52 is maintained substantially constant, the planar shape of the electric supplying wires 31, 32 may be a serpentine shape or a curved shape, the planar shape of the opposing wires 51 and 52 may be a curved shape or serpentine shape.

Further, in one or more embodiments, the openings of the resin-film are formed inside the opposing wires 51B, 52B, but are not limited thereto. The openings may be located anywhere inside the area where the conductive circuit is formed and outside the circular region CA. For example, the openings may be formed between the opposing wires, or within the main wire or sub wire of the electric supplying wire.

The resin-film 10 and the conductive circuit 30B is formed by patterning the aluminum foil of aluminum foil/PET composite film by etching or the like. This aluminum foil/PET composite film is a composite material in which an aluminum foil is bonded to a polyester film via an adhesive layer. The specific examples of such aluminum foil/PET complex films are not particularly limited, but Alpet (registered trademark) manufactured by Panac Corporation can be exemplified. The material constituting conductive circuit 30B is not limited to aluminum, may be an aluminum alloy, copper, copper alloy, or stainless steel or the like.

Also, the thicknesses $T_5$ of the opposing wires 51, 52 are of the same height as the thicknesses $T_2$ of the electric supplying wires 31, 32, but are not particularly limited ($T_5=T_2$).

The pads 55 are provided spaced apart from the electric supplying wires 31 and 32 in the interior of the electric supplying wires 31 and 32. That is, the pads 55 are electrically isolated from the electric supplying wires 31 and 32. The pads 55 function as a connecting part for mounting an electronic component or a circuit board on the planar heating element 1B. Although not shown in the drawings, as an example, through holes are formed in the pads 55, each of electrodes of the pair of circuit boards are opposed via the through-holes, then a pressure sensor may be formed by utilizing the through-holes.

In the planar heating element 1B, a circuit different from the conductive circuit 30B described above may be further formed on the resin-film 10. For example, although not shown in particular, temperature sensors may be disposed in conductive resin portion 60A-60M respectively, and wires connected to the respective temperature sensors may be formed on the resin-film 10 independently of the conductive circuit 30B.

The conductive resin portion 60A-60M are resistors for heating by being applied a voltage, is composed of a conductive resin having a higher electrical resistance value than the electrical resistance value of the opposing wires 51 and 52. The conductive resin portions 60A-60M are formed on the resin-film 10 so as to cover the conductive circuit 30B.

The number of the conductive resin portions that conductive circuit 30A has is not particularly limited to the above, the number can be arbitrarily set. The shape and arrangement of the conductive resin portion are not particularly limited to the shape and arrangement described below. In one or more embodiments, the presence or absence of the conductive resin portion and conductive resin portion of any shapes can be combined to easily set the distribution of the calorific value to a desired distribution in the planar heating element 1B.

As shown in FIG. 13, three conductive resin portions 60A-60C are arranged in the central portion of the resin-film 10.

The conductive resin portions 60A, 60B are disposed between the recess 12H and the opening 11H of the resin-film 10 so as to cover the opposing wires 51 and 52. This conductive resin portion 60A, 60B has the same planar form. The conductive resin portion 60A, 60B are spaced apart from one another and arranged in line symmetry with respect to virtual straight line $VL_1$ (see FIG. 11).

Gap 63 is interposed between the conductive resin portion 60A and the conductive resin portion 60B. Longitudinal direction (Y direction in the drawing) of the gap 63 is substantially perpendicular to the longitudinal direction (X direction in the drawing) of the opposing wires 51 and 52.

As shown in FIG. 10, the conductive resin portion 60A includes intervening portions 61 and covering portions 62. The intervening portion 61 is a portion interposed between the opposing wires 51 and 52 facing each other, is a portion that contributes to heat generation. This intervening portion 61 is formed directly on the resin-film 10. The current supplied through the opposing wire 51 and 52 flows through the intervening portion 61, then the intervening portion 61 generates heat by resistively heated.

In contrast, the covering portion 62 is a portion interposed between the intervening portions 61, has a function of protecting the opposing wires 51 and 52 by covering the opposing wire 51 and 52. Further, this covering portion 62 is integrally formed with the intervening portion 61.

Although not shown in particular, the conductive resin portion 60B also has intervening portions and covering portions of the same manner as the conductive resin portion 60A. Further, the conductive resin portions 60C-60M described below, although not particularly shown, has intervening portions and covering portions.

As shown in FIG. 13, the conductive resin portion 60C is disposed next to the conductive resin portions 60A, 60B via the opening 11I and is disposed between the openings 11I and the opening 11J. The conductive resin portion 60C has a rectangular planar shape having an area larger than that of the above conductive resin portions 60A, 60B, and is disposed on the resin-film 10 so as to cover all of the opposing wires 51 and 52 disposed between the openings 11I and openings 11J.

The four conductive resin portions 60D-60G are disposed around the conductive resin portions 60A-60C.

The conductive resin portions 60D, 60E are disposed radially about the specified point SP and outside of the conductive resin portions 60A-60C as described above and are isolated from the conductive resin portions 60A-60C. The conductive resin portions 60D, 60E have planar shapes that are line-symmetrical with respect to the virtual straight line $VL_1$, and the plane shapes of the conductive resin portions 60D, 60E are a rectangle that differs from the plane shapes of the conductive resin portions 60A-60C.

Similarly, the conductive resin portions 60F, 60G are located radially about the specified point SP and outside the conductive resin portions 60A-60E and are isolated from the conductive resin portion 60C. The conductive resin portions 60F, 60G have planar shapes that are line-symmetrical with respect to the virtual straight line $VL_1$, and the planar shapes of the conductive resin portions 60F, 60G are rectangle that differs from the planar shapes of the conductive resin portions 60A-60C.

The same gap 63 as described above is interposed between the conductive resin portions 60D-60G and the conductive resin portions 60A-60C, the gap 63 extends along the longitudinal direction (Y direction in the drawing) of the resin-film 10.

The six conductive resin portions 60H-60M are disposed around the conductive resin portions 60D-60G.

The conductive resin portions 60H, 60I are disposed radially about the specified point SP and outside the conductive resin portions 60D, 60E and are isolated from the conductive resin portions 60D, 60E. The conductive resin portions 60H, 60I have a trapezoidal planar shapes. The three sides of the trapezoidal shape extend along the electric supplying wires 31 and 32. In addition, the conductive resin portions 60H,60I have planar shapes that is line-symmetrical with respect to the virtual straight line $VL_1$.

Similarly, the conductive resin portions 60J, 60K are disposed radially about the specified point SP and outside the conductive resin portions 60D-60G and are isolated from the conductive resin portions 60D-60G. In addition, the conductive resin portion 60J is disposed between the conductive resin portion 60H and the conductive resin portion 60L, and the conductive resin portion 60K is disposed between the conductive resin portion 60I and the conductive resin portion 60M.

The conductive resin portions 60J, 60K have a trapezoidal planar shape. The three sides of the trapezoidal shape extend along the electric supplying wires 31 and 32. The planar shapes of the conductive resin portions 60J, 60K are different from the planar shapes of the conductive resin portions 60H, 60I. In addition, the conductive resin portions 60J, 60K have planar shapes that are line-symmetrical with respect to the virtual straight line $VL_1$.

The conductive resin portions 60L, 60M are disposed radially about the specified point SP and outside the conductive resin portions 60F, 60G and are isolated from the conductive resin portions 60F, 60G. The conductive resin portions 60L, 60M have a trapezoidal planar shape. The three sides of the trapezoidal shape extend along the electric supplying wires 31 and 32, the planar shape of the conductive resin portions 60L, 60M are different from the planar shapes of the conductive resin portions 60H-60K. In addition, the conductive resin portions 60L, 60M have planar shapes that are line-symmetrical with respect to the virtual straight line $VL_1$.

The gap 63 as described above is interposed between the conductive resin portions 60H-60M and the conductive resin portions 60D-60G, the gap 63 extends along the longitudinal direction (Y direction in the drawing) of the resin-film 10.

As described above, the gap 63 is interposed between the conductive resin portions 60A-60M, the longitudinal direction (Y direction in the drawing) of the gap 63 is substantially perpendicular to the longitudinal direction (X direction in the drawing) of the opposing wires 51 and 52, when the planar heating element 1B is bent about the Y direction in the drawing, it is possible to reduce the bending resistance of the planar heating element 1B. Further, the conductive resin portions 60A-60M are more difficult to peel off from the opposing wires 51, 52, electric connectivity between the opposing wires 51, 52 and the conductive resin portions 60A-60M can be maintained.

In one or more embodiments, the thicknesses $T_6$ of the conductive resin portions 60A-60M may be greater than or equal to thicknesses $T_5$ of the opposing wires 51 and 52 ($T_6 \geq T_5$), but not particularly limited to 10 to 30 micrometers (10 micrometers$\leq T_6 \leq$30 micrometers).

The thicknesses of the conductive resin portions 60A-60M may be different from each other. The calorific value of the conductive resin portions 60A-60M vary depending on thickness. Therefore, in the planar heating element 1B, it is possible to easily set the distribution of the calorific value to the desired distribution.

As an example, as shown in FIG. 14, the thickness $T_A$ of the conductive resin portion 60A may be thinned while the thickness $T_C$ of the conductive resin portion 60C is thicker ($T_A < T_C$). Thus, the resistance value of the conductive resin portion 60C becomes smaller than the resistance value of the conductive resin portion 60A, and the heat value of the conductive resin portion 60C can be made larger than the heat value of the conductive resin portion 60A. As a method of changing the thickness of the conductive resin portion, a method of changing the number of times of applying the conductive resin-paste to be described later can be exemplified. Incidentally, FIG. 14 is a diagram corresponding to FIG. 10 described above.

In one or more embodiments, the volume resistivities $\rho_1$ of the conductive resin portions 60A-60M are, for example, $1.0*10^{-1}$ Ωm~$1.0*10^{-2}$ Ωm ($1.0*10^{-1}$ Ωm$\leq \rho_1 \leq 1.0*10^{-2}$ Ωm).

Such conductive resin portions 60A-60M are formed by applying and curing a conductive resin paste to the resin-film 10. As a specific example of such a conductive resin paste, a paste containing a crystalline resin, a binder resin, and a conductor can be exemplified. Examples of the crystalline resin include a polyolefin-based resin and a vinyl-based resin. Examples of the binder resin include synthetic rubbers such as isopropylene rubber, butadiene rubber, nitrile rubber, ethylene propylene rubber, and silicon rubber, or thermoplastic elastomers. The conductor can be exemplified carbon or graphite.

A method of applying the conductive resin paste is not particularly limited, any of a contact coating method and a non-contact coating method may be used. Examples of the contact coating method include screen printing, gravure printing, offset printing, gravure offset printing, flexographic printing, and the like. Meanwhile, as specific examples of the non-contact coating method, ink jet printing, a spray coating method, a dispense coating method, a jet dispensing method, and the like can be exemplified. Further, a method of curing the conductive resin paste is not particularly limited, but a heat treatment, an ultraviolet irradiation treatment, or the like can be exemplified.

In addition, the conductive resin portions 60A-60M may be made of the conductive resin-materials that differ from each other. For example, the mixing ratio of the crystalline resin, the binder resin, and the conductor in the conductive resin paste may be changed, or the metal filler may be further mixed in the conductive resin paste described above.

Because the conductive resin portions 60A-60M are made of different conductive plastic materials, the volume resistivity of the conductive resin portions 60A-60M are different from each other. The calorific value also differs for each conductive resin portion 60A-60M. Therefore, in the planar heating element 1B, it is possible to easily set the distribution of the calorific value to the desired distribution.

Further, in one or more embodiments, the conductive resin portions 60A-60M are disposed independently from each other and the gaps 63 are interposed therebetween, but are not limited thereto. all of the opposing wires 51, 51A, 52, 52A may be covered one conductive resin portion.

As shown in FIGS. 9 and 10, the supporting layer 80 is affixed to the resin-film 10 via the adhesive layer 70 so as to cover the heating portion 20B. The supporting layer 80 is rigid enough to support the resin-film 10. As shown in FIG. 9, the supporting layer 80 has a rectangular shape similar to the resin-film 10, and covers the entire surface of the resin-film 10, thereby imparts stiffness to the planar heating element 1B.

In the supporting layer 80, the recess is not formed at a position corresponding to the recess 12H-12L of the resin film 10, the supporting layer 80 covers the recesses 12H-12L of the resin-film 10. In this way, the wide recess 12H-12L are covered with the supporting layer 80, the surrounding areas of the recesses 12H-12L can easily return to their original shape after the planar heating element 1A is deformed. Incidentally, when recess of the resin film 10 is narrower, supporting layer 80 may have a recess corresponding to recess of the resin film 10. That is, the supporting layer 80 may not cover the recesses 12H-12L.

Further, the supporting layer 80 has the openings 82G-82L corresponding to the openings 11G-11L of the resin-film 10. The openings 82G-82L of the supporting layer 80 are arranged so as to overlap the openings 11G-11L of the resin-film 10, and have the same planar shape as the openings 11G-11L. Although not particularly limited, the supporting layer 80 may not have openings 82G-82L. That is, the supporting layer 80 may cover the openings 11G-11L of the resin-film 10.

The supporting layer 80 is not particularly limited, but a woven fabric or a nonwoven fabric can be used as the supporting layer 80. It is possible to suppress the occurrence of bending or cracking in the resin-film 10 by attaching the supporting layer 80 to the resin-film 10.

Further, as the supporting layer 80, a woven fabric is particularly preferably used. Because the woven fabric has stretchable, the use of the woven fabric as the supporting layer 80 can assist in returning to its original form after the planar heating element 1B is deformed.

As the fibers constituting the woven fabric or the nonwoven fabric, for example, resin fibers, glass fibers, and the like can be exemplified. As the resin fiber, for example, nylon fibers, rayon fibers, polyester fibers, polyamide fibers, vinyl fibers, aramid fibers, and the like can be exemplified.

The thickness $T_4$ of the supporting layer 80 can be thicker ($T_1 \leq T_4$) than thickness $T_1$ of the resin-film 10, for example, may be 80 to 200 micrometers (80 micrometers$\leq T_4 \leq$200 micrometers).

The adhesive layer 70 is not particularly limited, but an adhesive containing a resin as a main component, a hot melt, a double-sided tape, or the like can be used. The adhesive layer 70 can also function as a resist layer for protecting the heating portion 20B. That is, the adhesive layers 70 can improve the weather resistance of the planar heating element 1B by exhibiting the surface-protective performance and drip-proof performance of the heating portion 20B.

In this example, the adhesive layer 70 is formed on the entire surface of the resin film 10 Incidentally, the adhesive layer 70 may be formed over the entire circumference on the outer peripheral portion of the resin film 10, and the adhesive layer 70 may be partially formed in the inner region than the outer peripheral portion.

The supporting layer 80 and the adhesive layer 70 may not cover the terminals 311, 321 of the electric supplying wires 31 and 32. Further, the supporting layer 80 may be formed on the lower surface 102 (refer to FIG. 10) of the resin-film 10. Furthermore, the supporting layer 80 may be formed on both the upper surface 101 and the lower surface 102 of the resin-film 10.

As described above, according to the planar heating element 1B of one or more embodiments, because the openings 11G-11L are formed in the region in which deformation due to load is large in the resin-film 10 (i.e., the region of the outer side of the circular region CA), the stress due to deformation of the resin-film 10 is reduced, and the occurrence of breakage or cracking of the resin-film 10 can be restrained. Further, the generation of abnormal noise due to modification of the resin-film 10 can be reduced, because the apertures 11G-11L also relieve stress in the resin film 10.

Further, because the recesses 12H-12L are formed on the outer periphery of the resin-film 10 so as to surround the specified point SP where the resin-film 10 is easily loaded, the stress caused by deformation around the specific point SP of the resin film 10 is reduced, and the resin-film 10 can be suppressed from breaking or cracking. Further, the generation of abnormal noise due to deformation of the resin-film 10 because the stress of the resin-film 10 is relieved by the recesses 12H-12L.

Further, according to the planar heating element 1B of one or more embodiments, because the supporting layer 80 composed of the woven fabric or the non-woven fabric is stuck to the resin-film 10, the supporting layer 80 reduces stresses due to deformation of the resin-film 10. Therefore, the generation of breakage or cracking of the resin-film 10 is restrained. Further, the generation of abnormal noise due to deformation of the resin-film 10 because the stress of the resin-film 10 is relieved by the supporting layer 80.

In particular, as in one or more embodiments, when the thickness $T_1$ of the resin-film 10 is 50 micrometers or less, the resin film 10 is likely to be broken or cracked. Because the opening 11G-11L or the recesses 12H-12L as described above are formed, the occurrence of bending or cracking of the resin-film 10 can be suppressed. Further, when the thickness $T_1$ of the resin-film 10 is 50 micrometers or less, the above-described abnormal noise is also likely to occur. Because the openings 11G-11L or the recesses 12H-12L as described above is formed, the generation of abnormal noise can be suppressed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATIONS OF LETTERS OR NUMERALS 1A,1B . . . Planar heating element
10 . . . Resin film
11A-11F, 11G-11L . . . Openings
12A-12G, 12H-12L . . . Recesses
101 . . . Upper surface
102 . . . Lower surface
10*a*-10*d* . . . First to fourth sides
SP . . . Specified point
CA . . . Circular region
R . . . Circular region radius
$VL_1$, $VL_2$ . . . Virtual straight line
$VC_1$, $VC_2$ . . . Virtual circle
L1 . . . Length of opening in longitudinal direction
L2 . . . Length of opening in lateral direction
20A, 20B . . . Heating portion
30A, 30B . . . Conductive circuit
31,32 . . . Electric supplying wire
311,321 . . . Terminals
312,322 . . . Enlarged part
33,35 . . . Main wire
34,36 . . . Sub wire
40A . . . (First) Heat-generating portion
411 . . . Fine wire
412,414 . . . Folded portion
413 . . . Curved portion
415 . . . One end
416 . . . Other end
40B-40I . . . (Second) Heat-generating portion
421 . . . Fine wire
422 . . . Curved portion

423 . . . Folded portion
424 . . . One end
425 . . . Other end
40J-40M . . . Heat-generating portion
51,52,51A,52A, 51B, 52B . . . Opposing wires
53,54 . . . Openings
55 . . . Pad
60A-60M . . . Conductive resin portion
61 . . . Intervening portion
62 . . . Covering portion
63 . . . Gap
70 . . . Adhesive layer
80 . . . Supporting layer
81B,81C,81E,81F . . . Recesses
82A-82L . . . Openings

The invention claimed is:

1. A planar heating element comprising:
an insulating resin film having a short side and a long side; and
a heating portion that comprises a conductive circuit on the insulating resin film, wherein
the insulating resin film comprises missing portions:
penetrating the insulating resin film,
surrounding a point disposed at a center of the insulating resin film, and
comprising openings and recesses, wherein
the openings are disposed within the conductive circuit and outside of a circular region of a radius centered at the point,
the recesses are recessed toward an inside of the insulating resin film and located on an outer edge of the insulating resin film, and
the recesses comprise:
a first recess disposed on the short side and recessed toward the point; and
a second recess disposed on the long side and recessed toward the point.

2. The planar heating element according to claim 1, wherein
the missing portions comprise:
first missing portions that are disposed on one side of a virtual straight line passing through the point and extending along a first direction; and
second missing portions that are disposed on the other side of the virtual straight line,
the first direction is along a longitudinal direction of the insulating resin film or a lateral direction of the insulating resin film, and
in the first direction, the point is interposed between the first missing portions and between the second missing portions.

3. The planar heating element according to claim 1, further comprising:
a supporting layer that is composed of a woven fabric or a non-woven fabric and attached to a side of the insulating resin film on which the heating portion is disposed.

4. The planar heating element according to claim 3, wherein a thickness of the insulating resin film is less than 50 micrometer and smaller than a thickness of the supporting layer.

5. The planar heating element according to claim 1, wherein
the conductive circuit comprises:
a pair of electric supplying wires; and
heat-generating portions:
including accumulating fine wires each having a line width narrower than the pair of electric supplying wires, and
electrically connected to the pair of electric supplying wires in parallel.

6. The planar heating element according to claim 5, wherein the heat-generating portions comprise a first heat-generating portion having a planar shape in which the accumulating fine wires are folded back and wound in a spiral shape.

7. The planar heating element according to claim 5, wherein
the accumulating fine wires comprise curved portions extending alongside each other through folded portions of the accumulating fine wires, and
the heat-generating portions comprise a second heat-generating portion having a planar shape in which the curved portions are concentrically disposed around the point.

8. A planar heating element comprising:
an insulating resin film; and
a heating portion that comprises a conductive circuit on the insulating resin film, wherein
the insulating resin film comprises missing portions:
penetrating the insulating resin film,
surrounding a point on the insulating resin film, and
comprising one or both of openings and recesses, wherein
the openings are disposed within the conductive circuit and outside of a circular region of a radius centered at the point, and
the recesses are recessed toward an inside of the insulating resin film and located on an outer edge of the insulating resin film, wherein
the conductive circuit comprises:
a pair of opposing wires facing each other; and
a pair of electric supplying wires integrated with the pair of opposing wires, and
the heating portion comprises a conductive resin portion disposed on the insulating resin film and covering the pair of the opposing wires,
the conductive resin portion:
is composed of a conductive resin having a higher electrical resistance value than the pair of opposing wires, and
comprises an intervening portion between the pair of opposing wires.

9. The planar heating element according to claim 8, wherein
the heating portion has a gap between the conductive resin portions, and
a longitudinal direction of the gap is substantially perpendicular to a longitudinal direction of the pair of opposing wires.

10. The planar heating element according to claim 8, wherein the heating portion comprises the conductive resin portions having mutually different thicknesses.

11. The planar heating element according to claim 8, wherein the heating portion comprises the conductive resin portions composed of mutually different materials.

* * * * *